US012705026B1

(12) United States Patent
Wilson

(10) Patent No.: US 12,705,026 B1
(45) Date of Patent: Aug. 11, 2026

(54) METHOD AND DEVICE FOR RANDOM NUMBER GENERATION

(71) Applicant: Entropy Secure Pty Ltd., Canning Vale (AU)

(72) Inventor: David Shelton Jeremy Wilson, Noranda (AU)

(73) Assignee: Entropy Secure Pty Ltd., Canning Vale (AU)

( * ) Notice: Subject to any disclaimer, the term of this patent is extended or adjusted under 35 U.S.C. 154(b) by 0 days.

(21) Appl. No.: 19/318,740

(22) Filed: Sep. 4, 2025

(51) Int. Cl.
*G06F 7/58* (2006.01)

(52) U.S. Cl.
CPC .................................... *G06F 7/588* (2013.01)

(58) Field of Classification Search
CPC ................................................ G06F 7/58–588
See application file for complete search history.

(56) References Cited

U.S. PATENT DOCUMENTS 6,831,980 B1 * 12/2004 Borza ..................... G06F 7/588 380/46
7,523,243 B2 4/2009 Bohm et al.
10,200,401 B1 2/2019 Powers et al.
11,314,673 B2 4/2022 Govindarajan et al.
2003/0065691 A1 4/2003 Schmidt
2004/0078576 A1 4/2004 Geitinger
2005/0050122 A1 3/2005 Blumenthal et al.
2009/0259705 A1 10/2009 Kailas et al.
2016/0328211 A1 11/2016 Nordholt et al.
2019/0369965 A1 * 12/2019 Choi ..................... H04L 9/0852
2020/0401378 A1 12/2020 Steele, Jr.
2021/0247963 A1 8/2021 Buts et al.
2022/0391173 A1 * 12/2022 Garcia Coello ........ G06F 7/588
2024/0411902 A1 * 12/2024 Laubrock .............. H04L 9/0866
2025/0094130 A1 * 3/2025 Werner ................... G06F 7/588
2025/0217112 A1 * 7/2025 Pawlowski ............... G01J 1/44

FOREIGN PATENT DOCUMENTS

WO WO-2025027482 A1 * 2/2025 ............. G06F 7/588

* cited by examiner

*Primary Examiner* — Carlo Waje
(74) *Attorney, Agent, or Firm* — MUNCY, GEISSLER, OLDS & LOWE, P.C.

(57) ABSTRACT

A method and device for generating random numbers, via photons entering a non-opaque volume, illuminating a plurality of photodetectors with photons producing a stochastic response which is digitized to yield random numbers. Photodetectors may be illuminated via photons exiting via at least one surface which is not parallel to at least one plane in which lies a surface where light is entering, thereby illuminating photodetectors; or via, reflecting photons from at least one interior surface (of the non-opaque volume), wherein for a plurality of points thereon the degree of directionality is different, thereby illuminating photodetectors; or via, repeatedly reflecting photons from at least two interior surfaces of the non-opaque volume thereby illuminating photodetectors; or via, combinations or variations thereof.

30 Claims, 4 Drawing Sheets

METHOD AND DEVICE FOR RANDOM NUMBER GENERATION

FIELD OF THE INVENTION

The present invention relates to random number generator devices or methods for random number generation, or otherwise.

BACKGROUND OF THE INVENTION

Random number generators are of critical importance for the purposes of ensuring the security of encryption, encryption key generation, seeding, performing certain kinds of cryptographic operations etc. They are also necessary in a variety of other fields.

However, existing random number generators have problems, namely that the underlying source of unpredictability may not be truly random. For some applications, this may result in reduced security of encryption and related cryptography, otherwise it may reduce the level of assurance regarding the aforementioned. It has been shown that poorly functioning random number generators may produce insecure encryption keys. This often goes unknown or unnoticed thereby engendering a level of risk. Accordingly, there is a need in the art for improved random number generators.

SUMMARY OF THE INVENTION

At least one embodiment of the present invention may have at least one light source emitting photons entering at least one non-opaque volume, at least one surface adapted to reflect photons internal to the volume, a plurality of photodetectors with at least one illuminated with photons, at least one digitizer digitizing the response (or subset thereof) of photodetectors, yielding random numbers, wherein the response is stochastic. In at least one embodiment, at least one light source emits photons entering the at least one non-opaque volume which propagate via multiple reflections through the volume and exit through at least one surface thus illuminating at least one photodetector wherein at least one surface where photons exit may not be parallel to at least one plane in which lie the surface(s) where photons entered. In at least one embodiment, the at least one light source emits photons entering the at least one non-opaque volume which may reflect from at least one surface thereby illuminating photodetectors, wherein for a plurality of points on at least one surface the degree of directionality may be different. In at least one embodiment, the at least one light source emits photons entering the at least one non-opaque volume which may reflect repeatedly between at least two surfaces thereby illuminating photodetectors, wherein at least one light source does not lie in the same plane as the photodetectors. At least one embodiment may have a combination of the aforementioned, or variations thereof.

In at least one embodiment, the configuration of the light source, non-opaque volume and photodetectors may comprise: the at least one light source emits photons entering the at least one non-opaque volume which propagate via multiple reflections through the volume and exit through at least one surface thus illuminating at least one photodetector wherein at least one surface where photons exit may not lie in a plane parallel to a plane in which lie the surface(s) where photons entered.

In at least one embodiment, the configuration of the light source, non-opaque volume and photodetectors may comprise: the at least one light source emits photons entering the at least one non-opaque volume which reflect from at least one surface thereby illuminating photodetectors, wherein for a plurality of points on at least one surface the degree of directionality is different.

In at least one embodiment, the configuration of the light source, non-opaque volume and photodetectors may comprise: the at least one light source emits photons entering the at least one non-opaque volume which reflect repeatedly between a plurality of surfaces thereby illuminating photodetectors, wherein at least one light source does not lie in the same plane as the photodetectors.

At least one embodiment may have at least one light source being a diode.

At least one embodiment may have at least one photodetector which is a pixel of a CMOS image sensor, and/or a pixel of a CCD image sensor, and/or combinations thereof.

In at least one embodiment, at least one photodetector may have a sensitivity limit from approximately the single- to few-photon level.

In at least one embodiment, the geometry of the non-opaque volume may have at least one pair of surfaces which may lie in parallel planes.

In at least one embodiment, the non-opaque volume may have a geometry constructed by taking a body having at least one pair of surfaces which lie in parallel planes, then angling one surface of the said pair towards the other.

In at least one embodiment, the non-opaque volume may have at least one adaptation which improves the uniformity of illumination.

At least one embodiment may post-process random numbers.

At least one embodiment may have at least one photodetector which may be strongly illuminated.

In at least one embodiment, the non-opaque volume may comprise optical free space.

In at least one embodiment, the non-opaque volume may comprise at least one glassy material.

In at least one embodiment, the non-opaque volume may comprise at least one polymeric material.

In at least one embodiment, the bulk of the non-opaque volume may scatter light.

At least one embodiment may have photons entering a non-opaque volume, illuminating a plurality of photodetectors with photons such that the response of photodetectors is stochastic, digitizing the response to yield random numbers. At least one embodiment may propagate photons via multiple reflections and have photons exiting via at least one surface which may not be parallel to at least one plane in which lies a surface where light is entering, thereby illuminating photodetectors. At least one embodiment may be reflecting photons from at least one interior surface (of the non-opaque volume), wherein for a plurality of points thereon the degree of directionality may be different, thereby illuminating photodetectors. At least one embodiment may be repeatedly reflecting photons from at least two interior surfaces of the non-opaque volume thereby illuminating photodetectors which do not lie in the same plane as a light source(s) emitting light. At least one embodiment may have any combination of the aforementioned, or variations thereof.

At least one embodiment may propagate via multiple reflections and have photons exiting via at least one surface which may not be parallel to at least one plane in which lies a surface where light is entering, thereby illuminating photodetectors.

At least one embodiment may be reflecting photons from at least one interior surface (of the non-opaque volume), wherein for a plurality of points thereon the degree of directionality may be different, thereby illuminating photodetectors.

At least one embodiment may be repeatedly reflecting photons from at least two interior surfaces of the non-opaque volume thereby illuminating photodetectors which do not lie in the same plane as a light source(s) emitting light.

At least one embodiment may be emitting photons using a diode.

At least one embodiment may be producing a response from at least one photodetector which may be a pixel of a CMOS image sensor and/or a pixel of a CCD image sensor, and/or combinations thereof.

At least one embodiment may be producing a response from at least one photodetector having a sensitivity limit from the single- to few-photon level.

In at least one embodiment, the non-opaque volume may have at least one adaptation improving the uniformity of illumination.

At least one embodiment may be post-processing the random numbers.

At least one embodiment may be strongly illuminating at least one photodetector.

At least one embodiment may be scattering light within the bulk of the non-opaque volume.

In at least one embodiment, at least one photodetector is illuminated such that the contribution of photon shot noise to a total noise of a response of the at least one photodetector exceeds the contribution of photodetector dark noise to the total noise.

One exemplary problem which some (though not necessarily all) embodiments attempt to address is the bulkiness or non-compactness of random number generators, including the bulkiness contributed by the illumination structure or illumination method.

One exemplary advantage which may be exhibited by some (though not necessarily all) embodiments is a more compact illumination structure.

One exemplary problem which some (though not necessarily all) embodiments attempt to address is the non-uniform illumination of photodetectors.

One exemplary advantage which may be exhibited by some (though not necessarily all) embodiments is a more uniform illumination pattern.

One exemplary problem which some (though not necessarily all) embodiments attempt to address is inability to attain a sufficiently uniform illumination of photodetectors while maintaining compactness.

One exemplary advantage which may be exhibited by some (though not necessarily all) embodiments is a more uniform illumination pattern while maintaining compactness.

One exemplary problem which some (though not necessarily all) embodiments attempt to address is the inability to exceed the degree of uniformity provided by an ideal Lambertian illumination pattern or projections thereof and/or provide a similar degree of uniformity more compactly and/or illuminate a larger area with an acceptable degree of uniformity.

One exemplary advantage which may be exhibited by some (though not necessarily all) embodiments is the ability to exceed the degree of uniformity provided by an ideal Lambertian illumination pattern or projections thereof and/or provide a similar degree of uniformity more compactly and/or illuminate a larger area with an acceptable degree of uniformity.

One exemplary problem which some (though not necessarily all) embodiments attempt to address is the inability to control the pattern of illumination or increase uniformity.

One exemplary advantage which may be exhibited by some embodiments (though not necessarily all) is that the non-opaque volume(s) (geometry, surface characteristics, optical characteristics, composition etc.) may be adapted to provide control of the pattern of illumination and/or increase uniformity.

One exemplary advantage which may be exhibited by some embodiments (though not necessarily all) is a plurality of points on at least one surface of the at least one non-opaque volume, a degree of directionality is different. For some embodiments, this may advantageously enable control of the illumination pattern or increased uniformity.

One exemplary advantage which may be exhibited by some embodiments (though not necessarily all) is the adaptation of a non-opaque volume to advantageously enable control of the illumination pattern or increased uniformity.

One exemplary problem which some (though not necessarily all) embodiments attempt to address is the degradation of aspects of random number generator performance due to non-uniform illumination including but not limited to entropy, randomness, data rate, entropy rate, statistical characteristics, correlations, autocorrelations etc.

One exemplary advantage which may be exhibited by some (though not necessarily all) embodiments is potential improvements regarding aspects of random number generator performance due to the more uniform illumination including but not limited to entropy, randomness, data rate, entropy rate, statistical characteristics, correlations, autocorrelations etc.

One exemplary problem which some (though not necessarily all) embodiments attempt to address is the difficulty to properly conduct (or the additional complexity introduced into) random number postprocessing (randomness extraction or otherwise) by the effects of non-uniformity in illumination.

One exemplary advantage which may be exhibited by some (though not necessarily all) embodiments is simplified postprocessing (randomness extraction or otherwise) due to the more uniform illumination or more consistent statistical characteristics or otherwise.

One exemplary problem which some (though not necessarily all) embodiments attempt to address is the lack of consistency of statistical characteristics across photodetectors due to non-uniformity in illumination.

One exemplary advantage which may be exhibited by some (though not necessarily all) embodiments is more consistent statistical characteristics across photodetectors due to the more uniform illumination.

One exemplary problem which some (though not necessarily all) embodiments attempt to address is the difficulty to properly characterize (or additional complexity introduced therein) statistical characteristics due to non-uniform illumination.

One exemplary advantage which may be exhibited by some (though not necessarily all) embodiments is that statistical characteristics are more easily characterized due to the more uniform illumination.

One exemplary problem which some (though not necessarily all) embodiments attempt to address is the difficulty (or increased complexity) to properly configure/adapt postprocessing (randomness extraction or otherwise) due to the effects of non-uniformity in illumination.

One exemplary advantage which may be exhibited by some (though not necessarily all) embodiments is that postprocessing (randomness extraction or otherwise) is more easily configured/adapted due to the more uniform illumination and/or more easily characterized statistical characteristics or otherwise.

One exemplary problem which some (though not necessarily all) embodiments attempt to address is the difficulty illuminating a larger area with sufficient uniformity thereby limiting the number of photodetectors and/or placement of photodetectors.

One exemplary advantage which may be exhibited by some (though not necessarily all) embodiments is the ability to illuminate a larger area with sufficient uniformity thereby allowing for a larger number of photodetectors and/or more flexible placement of photodetectors.

One exemplary problem which some (though not necessarily all) embodiments attempt to address is the constriction of random number generator data rate or throughput introduced by the difficulty of illuminating a larger area with sufficient uniformity thereby limiting the number of photodetectors and thus the volumes of random numbers produced.

One exemplary advantage which may be exhibited by some (though not necessarily all) embodiments is the ability to illuminate a larger area with sufficient uniformity thereby allowing for a larger number of photodetectors leading to increased data rate (rate of producing random numbers).

One exemplary advantage which may be exhibited by some (though not necessarily all) embodiments is lower or improved cost, or ratio of cost to performance.

One exemplary advantage which may be exhibited by some (though not necessarily all) embodiments is improved manufacturability.

One exemplary problem which some (though not necessarily all) embodiments attempt to address is the limited range of possible geometric configurations which are acceptable or practical.

One exemplary advantage which may be exhibited by some (though not necessarily all) embodiments is a wider range of possible geometric configurations which are acceptable/practical.

One exemplary problem which some (though not necessarily all) embodiments attempt to address is the limited range of possible material compositions and/or configurations which are acceptable.

One exemplary advantage which may be exhibited by some (though not necessarily all) embodiments is a wider range of possible material compositions and/or configurations of the non-opaque volume which are acceptable.

One exemplary problem which some (though not necessarily all) embodiments attempt to address is the inability to utilize optical free space thereby requiring costly/bulky/heavy optical quality materials.

One exemplary advantage which may be exhibited by some (though not necessarily all) embodiments is that the non-opaque volume may include optical free space thereby reducing weight, bulkiness, and/or cost.

One exemplary advantage which may be exhibited by some (though not necessarily all) embodiments is the utilization of low-cost photodetectors.

One exemplary problem which some (though not necessarily all) embodiments attempt to address is the inability to use photodetectors with low or lesser degree of linearity.

One exemplary advantage which may be exhibited by some (though not necessarily all) embodiments is the utilization of photodetectors with low or lesser degree of linearity.

One exemplary advantage which may be exhibited by some (though not necessarily all) embodiments is the utilization of photodetectors with high or higher degree of linearity.

One exemplary problem which some (though not necessarily all) embodiments attempt to address are various difficulties regarding using image sensors or pixels thereof as photodetectors in some embodiments. This includes but is not limited to CMOS/CCD image sensors and pixels thereof.

One exemplary advantage which may be exhibited by some (though not necessarily all) embodiments is the utilization of image sensors or pixels thereof as photodetectors. This includes, but is not limited to CMOS/CCD image sensors and pixels thereof.

One exemplary problem which some (though not necessarily all) embodiments attempt to address is the fact that the bulkiness of the illumination structure negates or reduces the advantage of compactness which is offered by certain kinds of image sensors.

One exemplary advantage which may be exhibited by some (though not necessarily all) embodiments is the ability to illuminate image sensors such that the bulkiness of the illumination structure does not negate the advantage of the compactness of certain kinds of image sensors (including CMOS/CCD image sensors).

One exemplary problem which some (though not necessarily all) embodiments attempt to address is the inability to tolerate a wide range of different kinds of light sources.

One exemplary advantage which may be exhibited by some (though not necessarily all) embodiments is the ability tolerate a wider range of different kinds of light sources.

One exemplary problem which some (though not necessarily all) embodiments attempt to address is the inability to tolerate a wide range of different illumination patterns produced by the light source(s).

One exemplary advantage which may be exhibited by some (though not necessarily all) embodiments is the ability to tolerate a wider range of different illumination patterns produced by the light source(s) (including illuminations patterns with poor uniformity, non-Lambertian low divergence; poor diffuseness etc.) due to the adaptations of the non-opaque volume(s).

One exemplary problem which some (though not necessarily all) embodiments attempt to address is the inability to tolerate a wide range of potential placements, pitches, or locations of photodetectors.

One exemplary advantage which may be exhibited by some (though not necessarily all) embodiments is the ability to tolerate a wider range of potential placements, pitches, or locations of photodetectors due to the increased uniformity and/or range of configurations of the non-opaque-volumes.

One exemplary advantage which may be exhibited by some (though not necessarily all) embodiments is the ability to locate light source(s) at points such that the component of distance normal to the plane of photodetectors is (relatively) reduced thereby reducing bulkiness, this may be due to adaptations of the non-opaque volume(s) or otherwise.

One exemplary problem which some (though not necessarily all) embodiments attempt to address is the use of diffusers which add expense and are relatively ineffective at improving uniformity of illumination while delivering a compact illumination structure.

One exemplary advantage which may be exhibited by some (though not necessarily all) embodiments is the ability to eliminate the need for diffusers due to increased uniformity.

One exemplary problem which some (though not necessarily all) embodiments attempt to address is the difficulty in adjusting or determining an operable, operable but sub-optimal, or optimal illumination intensity and/or other parameters associated with operation of photodetector(s)/image sensor(s) or pixels thereof resulting from non-uniform illumination.

One exemplary advantage which may be exhibited by some (though not necessarily all) embodiments is the ability to more easily adjust or determine an operable, operable but sub-optimal, or optimal illumination intensity and/or other parameters associated with operation of photodetector(s)/image sensor(s) or pixels thereof due to more uniform illumination.

One exemplary problem which some (though not necessarily all) embodiments attempt to address is the inability to locate light sources in a plane that is not parallel to photodetectors and/or for photons to exit from a surface in a plane not parallel to the plane/surface where they enter the non-opaque volume and/or for photons to exit from a surface in a plane not parallel to the plane in which photodetector(s) lie.

One exemplary advantage which may be exhibited by some (though not necessarily all) embodiments is the ability to locate light sources in a plane that is not parallel to photodetectors and/or for photons to exit from a surface in a plane not parallel to the plane/surface where they enter the non-opaque volume and/or for photons to exit from a surface in a plane not parallel to the plane in which photodetector(s) lie.

DETAILED DESCRIPTION OF EMBODIMENTS

Figure 1A:
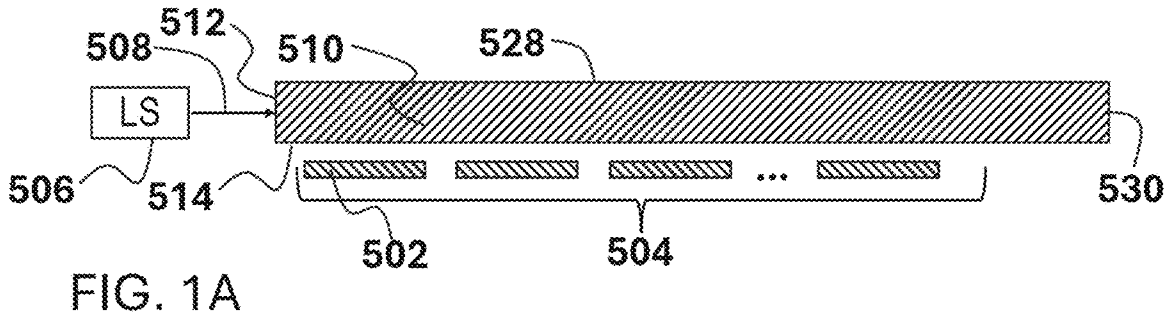
FIG. 1A shows a possible non-limiting example cross-section schematic view (not to scale) which may relate to some embodiments.
Figure 1B:
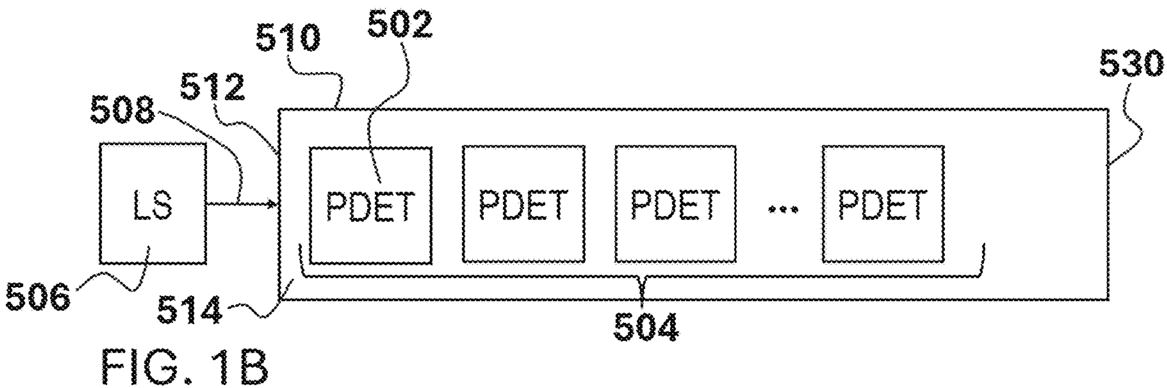
FIG. 1B shows a possible non-limiting example bottom schematic view (not to scale) which may relate to some embodiments.
Figure 1C:
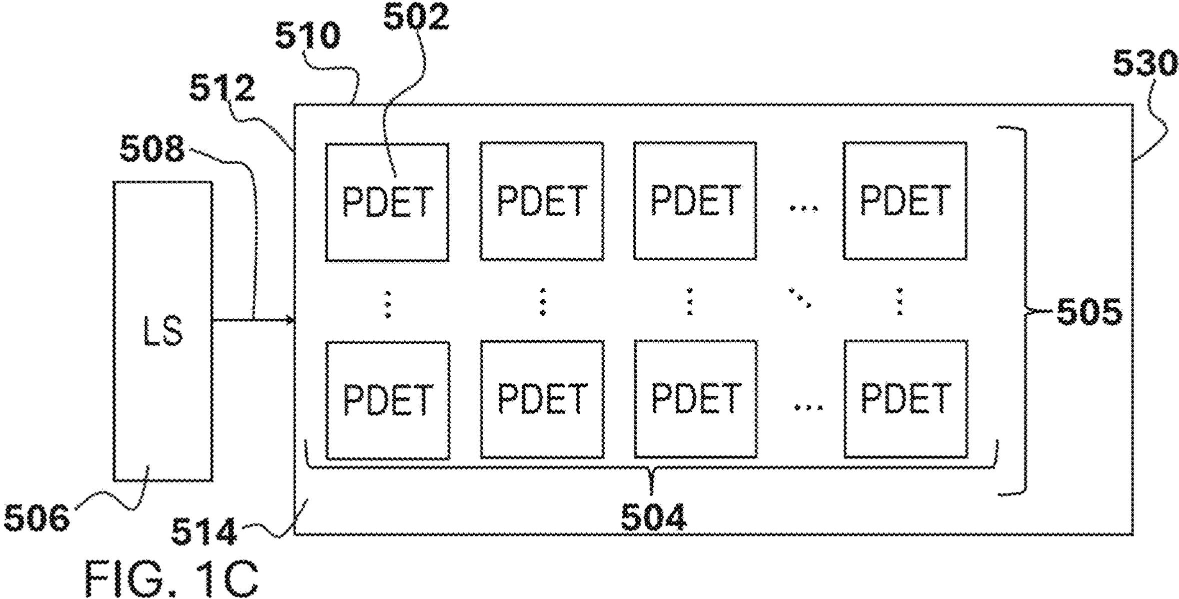
FIG. 1C shows another possible non-limiting example bottom schematic view (not to scale) which may relate to some embodiments.
Figure 1D:
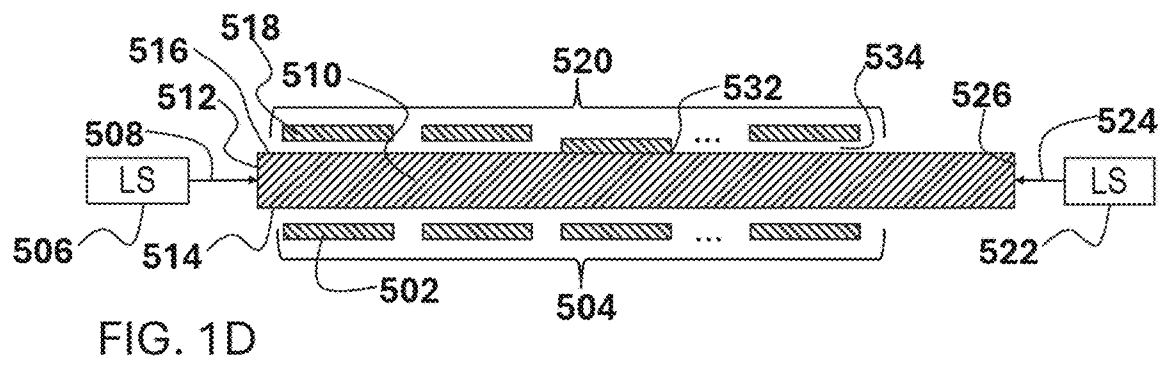
FIG. 1D shows another possible non-limiting example cross-section schematic view (not to scale) which may relate to some embodiments.

As used in the disclosure/specification, the term "exemplary" means "serving as an example, instance or illustration" and shall not be interpreted as indicating a preference, this includes a preference for any particular problem, advantage, embodiment, implementation or part thereof. As used in the disclosure/specification and claims, the singular forms "a", "an" and "the" include plural references unless context clearly dictates otherwise. As used in the disclosure/specification and claims, the terms "comprising," "including," "including but not limited to," "having," "containing," and variants thereof are used in the non-exhaustive or open-ended fashion, and thus do not exclude additional unrecited element(s), item(s), integer(s), part(s), feature(s), step(s), process(es), mean(s), structure(s) characteristics(s), component(s), ingredient(s), quality(ies), computer implemented method(s), etc. Contrastingly, the term "consisting of" is used in a closed fashion. As used in the disclosure/specification and claims, the phrase "A or B" means "only A, or only B, or A and B" unless context dictates otherwise; the term "or" is use inclusively and the term "and/or" may be used interchangeably with "or." Subsequently, phrases such as "A, B, or C," "A, B, C, or D" etc. mean "any combination of A, B and C," and "any combination of A, B, C and D" respectively. For example, phrases such as "A, B or C" and "A or B or C" means "only A, or only B, or only C, or only A and B, or only B and C, or only A and C, or A and B and C" etc. References to "an embodiment," "one embodiment," or "some embodiments" etc. may not necessarily refer to the same embodiment, although it may.

Referring to FIGS. 1E-1H, a photodetector (422) is a detector which produces a response to an incident light or photon (420) signal. The response may be proportional (linearly, quadratically, exponentially etc.) to any combination of the energy, power, amplitude, photon flux, photon count, etc., of the optical signal. Examples of photodetectors include, but are not limited to: photodiodes, photomultipliers, image sensors, pixels of image sensors, etc. Some photodetectors are event-driven and produce a signal upon the detection of a photon (or otherwise a pulse of light, such as a few-photon pulse, a weak coherent pulse, an attenuated pulse etc.). These include, but are not limited to: photomultiplier tubes/detectors, avalanche photodiode, single photon avalanche photodiode, silicon photomultipliers, transition edge sensors, superconducting nanowire single photon detectors etc. The response produced by such detectors includes: a photon count indicating the number of photons (or pulses) detected within a particular time interval, a time interval between an epoch and the detection of a photon or an optical pulse, or a time interval between the detection of two consecutive photons or optical pulses. Some photodetectors produce a response which is continuous. This includes photodiodes. The response of a photodiode comprises a photocurrent produced by the photodiode which is proportional to the rate at which photons are absorbed by the detector. Finally, there are also accumulation-based photodetectors wherein the response comprises a signal which is accumulated over a time interval. Event-based photodetectors in counting mode may be considered accumulation type photodetectors. A continuous photodetector can be made into an accumulation-type photodetector by a means of integrating, summing, or otherwise accumulating, the signal over a period of time. The pixels of a CMOS (complementary metal oxide semiconductor) or CCD (charge coupled device) image sensor may be considered to be accumulation-type photodetectors. In this case, photons absorbed by the pixel may create a photoelectron. Over a period of time, a particular number of photoelectrons proportional to the number of absorbed photons are generated resulting in the accumulation of charge which comprises the response of the pixel. The maximum number of photoelectrons is sometimes limited to a finite value after which the response saturates, this is called the full well capacity.

An image sensor means any assembly of photosensitive elements which samples a spatial distribution of light. One-dimensional and two-dimensional arrays of photodetectors are therefore image sensors. Likewise, cameras, CMOS image sensors and CCDs are also image sensors. An assembly for sampling the spatial distribution of light with photomultiplier tubes, photodiodes, etc. also comprises an image sensor. In the context of this specification, the term image refers not merely to the concept of an image in imaging optics but also to any spatial distribution of light, for example, the phrase 'observing an image' means to observe the spatial distribution of light. While image sensors can include imaging optics, this is not a requirement for classification of a photosensitive device as an image sensor in the context of this disclosure. In fact, CMOS image sensors and CCD devices usually do not include imaging optics unless they are integrated into a camera or other imaging system and the addition or omission of imaging optics would not prevent some embodiments from operating. Light sensitive elements are referred to as pixels, the data produced by image sensors comprises values corresponding to the response of pixels. Hence, a pixel is a type of photodetector. For a non-limiting illustrative example, a collection of three photodetectors may be considered a three-pixel image sensor wherein each photodetector comprises a pixel. Conversely, an n-pixel image sensor is a set of n photodetectors.

Each pixel of an image sensor is a photodetector. Hence, a single image sensor provides a plurality of photodetectors. Likewise, a plurality of image sensors provides a plurality of photodetectors. For a non-limiting example, CMOS/CCD image sensors may comprise of one- or two-dimensional arrays of pixels thus providing a plurality of photodetectors. Some embodiments comprise a plurality of image sensors. Some embodiments comprise a plurality of photodetectors. Some embodiments comprise an image sensor.

The response of a photodetector, image sensor or pixel may refer to either the analog response or the digitized response which is produced from the analog response by treating it with a digitizer (426). The digitized output may include random numbers (407), and/or other data. This includes any way of converting an analog signal to numerical data. For example, photomultiplier tubes, avalanche photodiode and other pulse generating or event-driven photodetectors can be digitized by a counter or counting mechanism producing a digitized response which is a numerical count. These devices can also be digitized by a timer, a timer-like mechanism, or a time to digital converter, which produces a numerical result corresponding to the time between detection or the time to detection etc. The signal produced by photodiodes, the pixels of CMOS/CCD image sensors can be digitized using an analogue to digital converter (ADC), also called a digitizer. The term quantizer also means ADC. This may include treating the signal to any combination of amplification, pre-amplification, signal conditioning, pre-conditioning etc. prior to digitization. The ADC may convert the analog signal to a symbolic or numerical representation which may be coded using: binary coding, gray coding, binary coded decimal, two's complement coding, one's complement coding, fixed point coding, floating point coding etc. A particular case of the ADC is a comparator, also known as a 1-bit ADC, which outputs a symbol to indicate that the input is above a particular threshold and a different symbol to indicate that the input is below a particular threshold (this may be represented by a single binary bit). Some comparators may exhibit hysteresis. For some image sensors, including CMOS/CCD image sensors, the means for digitization is integrated on-die. For some image sensors, including CMOS/CCD image sensors, digitization is implemented externally (not on-die). For some photodetectors, digitization is integrated. For some photodetectors, digitization is implemented externally.

Some embodiments produce random numbers (406) by digitizing (404) the response of photodetectors (402), wherein the response of the photodetector exhibits a degree of stochastic behavior which may arise due to several reasons or mechanisms (depending on the embodiment, photodetector type and operating conditions etc.). One such reason is that particular photodetector may still produce a response, even when the photodetector is in the dark. For example, a photodetector including photomultiplier tubes or avalanche photodiodes may exhibit a dark count which is known to be random/stochastic. Furthermore, photodetectors including photodiodes, photodiode-based image sensors, CMOS image sensor, etc., exhibit dark current. Since current is quantized by the electron charge, the dark current exhibits random fluctuations (including shot noise) arising due to the probabilistic nature of quantum mechanics. This may lead to random variations in the dark response of photodetectors. Though the entropy provided by the dark response of an individual photodiode of some embodiments may be small (in some cases), the total entropy scales with the number of photodiodes in the embodiment meaning that embodiment comprising of image sensors (when in the dark)

may generate a sufficiently larger amount of entropy. This is because image sensors may include many pixels or photodetectors. A second, mechanism arises from the quantum nature of light. Light is emitted as discrete packets called photons and the statistical distribution of photons is governed by quantum mechanics—this is a source of true randomness. In many cases, it is sufficient to model the statistical distribution of photons using a Poisson distribution (shot noise). This distribution has the property that the variance of the count of emitted photons may be equal (except for a statistical margin) to the mean. Sometimes, the variance can be less than the mean (sub-Poissonian light) or exceed the mean (super-Poissonian light). Hence, in some embodiments, there exists random or stochastic variations in the number of photons striking illuminated photodetectors. This, in turn, produces random or stochastic variations in the responses produced by such photodetectors. The photodetector, of some embodiments, is said to be strongly illuminated if the noise introduced by random variations in the number of photons (photon shot noise) renders the dark noise a lesser or insignificant contributor to the total noise. For some embodiments, there is no strict dependency on the linearity of the response or that the photodetectors be sensitive to single or few photon levels. Instead, for some embodiments, the fact that the magnitude of the noise (or similarly, the entropy content of pixel values) is increased relative to the dark noise in response to illumination may be one possible way to demonstrate that randomness is arising from the quantum nature of light. Hence, for some embodiments, comparison of the statistical distribution of response values from illuminated and non-illuminated photodetectors may be sufficient to demonstrate random variation in the number of photons striking photodetectors translating into the response. This applies to embodiments with linear photodetector, an embodiment non-linear photodetector, an embodiment with a photodetector sensitive to single photon levels or multiple photon levels, and an embodiment with a photodetector not sensitive to single photon levels and combinations thereof. Some embodiments may utilize commodity image sensors as photodetectors, which can sometimes display a variety of non-linear effects since they may be optimized for high dynamic range requiring a non-linear response. Furthermore, many of such image sensors (for some embodiments) may apply a non-linear correction to compensate for the non-linear response of the human eye. Furthermore, for some embodiments, manufacturing defects in the image sensor may lead to non-linearities or non-idealities in the response. For some embodiments, it may be unknown or uncharacterized if the image sensor is sensitive to single photon levels. However, the described statistical analysis may be sufficient to demonstrate that the sensitivity is sufficient to capture noise arising from the quantum nature of light. A third source of noise, in some embodiments, is the additional noise introduced by the image sensor signal processing chain—this arises due to a variety of physical effects including thermal noise, reset noise, supply noise etc.

Figure 4:
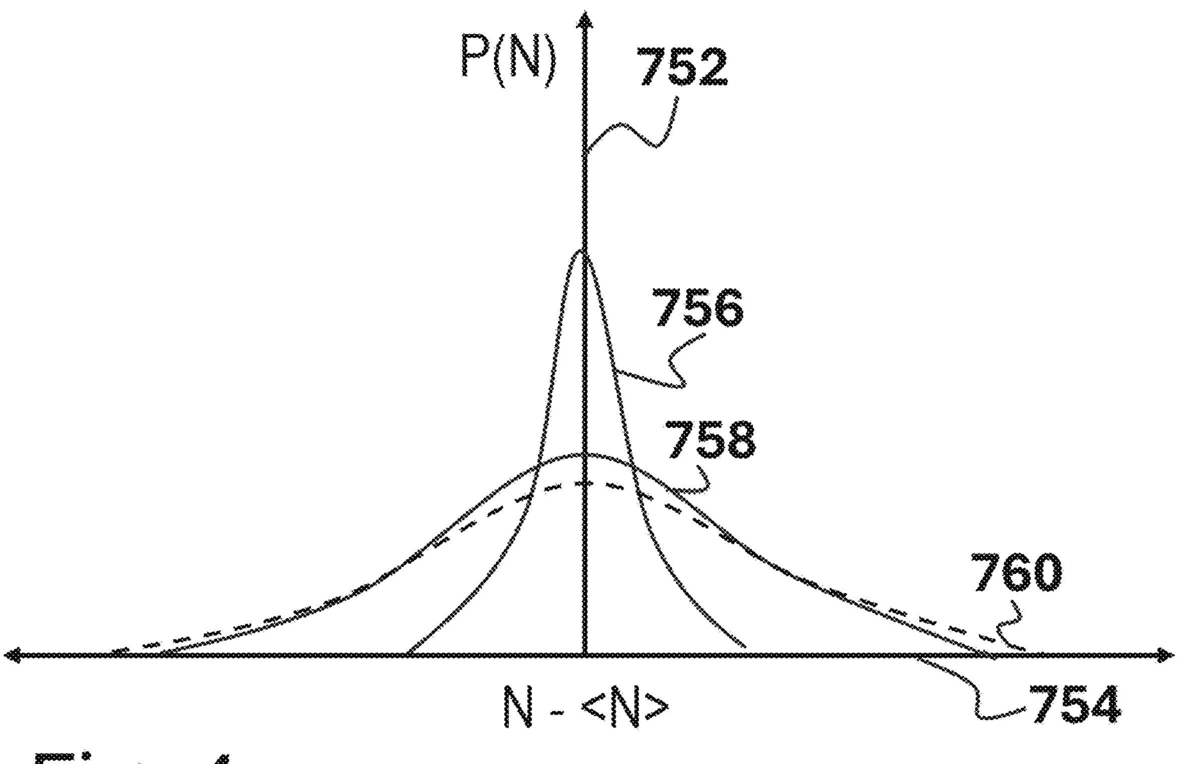
FIG. 4 is an illustrative comparison of the contribution of dark and photon-induced noise components, which may relate to some embodiments.

FIG. 4 is an illustrative example, which may apply to some embodiments, of probability (752) distribution of photodetector response minus the mean photodetector response (n−<n>, wherein n is the response) (754) showing the photodetector dark noise component (756) and component of noise due to incident photons/photon shot noise component (758). The contribution of photon shot noise to the total noise (760) may exceed the contribution of photodetector dark noise. This may be since the photon induced component (754) has larger spread and/or entropy compared to dark noise component (756). It should be noted that illustrated dark noise distribution (756), photon-induced noise distribution (758), and total noise distribution (760) does not imply any limitation on the actual distribution shape or function, the illustration merely contrasts the different degrees two components the component contribute to the total noise. For some embodiments, any of these distributions may be symmetrical. For some embodiments, any of these distributions may be asymmetrical or skewed etc. For some embodiments, any of these distribution may be Gaussian or Poissonian or exponential or some distribution function derived thereof, or another kind of distribution entirely.

A digitizer is a hardware component or device which performs digitization. A means for digitization can be implemented using a digitizer. Digitizers include, but are not limited to: analog to digital converters, quantizers, time to digital converters, counters (of pulses, photons etc.), timers (of pulses, inter-pulse time, photon arrival/inter-arrival times etc.), comparators (1-bit ADC or quantizer), charge to digital converts, etc. Any means of digitization may be considered a digitizer.

Figure 1E:
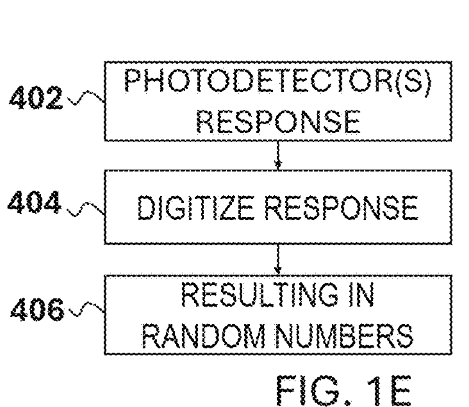
FIG. 1E shows possible non-limiting example of steps regarding the treatment of the photodetector response which may relate to some embodiments.

Referring to FIG. 1E, for some embodiments, the response of photodetector(s) (of any kind) (402) is digitized (404) yielding random numbers (406). For some embodiments, the digitizer is selected to be appropriate for the type or types of photodetectors comprising that embodiment. For a non-limiting illustrative example, embodiments having photodetectors such as photomultipliers, single photon avalanche photodiodes, avalanche photodiode, silicon photomultipliers and other pulse-producing photodetectors, possible digitizers may include (but are not limited to): time to digital converts, (pulse) counters, (pulse) timers, combinations and variation thereof etc. For a non-limiting illustrative example, embodiments having photodetectors such as photodiodes, CMOS image sensors, CCD image sensors, possible digitizers may include (but are not limited to): analog to digital converters, comparators, quantizers, analog to digital converters wherein the signal is treated by a transimpedance amplifier and/or charge accumulator and/or integrator, variation and combinations thereof, etc. For a non-limiting illustrative example, embodiments having photodetectors such as any form of photodiode in photoconductive or photovoltaic mode, possible digitizers may include (but are not limited to): analogue to digital converts, comparators, quantizers, analog to digital converters wherein the signal is treated by an integrator and/or charge accumulator and/or transimpedance amplifier, variations thereof, and combinations thereof, etc. For some embodiments, particular photodetectors may have more than one appropriate digitizer. For a non-limiting illustrate example, silicon photomultipliers can also be digitized using analogue to digital converters, analogue to digital converters wherein the signal is treated with an integrator and/or charge accumulator and/or transimpedance amplifier, and variations or combinations thereof etc. in addition to the digitizer mentioned previously.

Figure 1F:
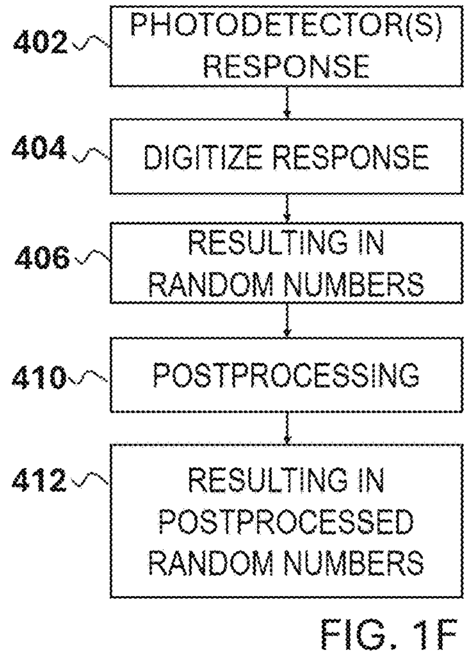
FIG. 1F shows another possible example of steps regarding treatment of the photodetector response which may relate to some embodiments.
Figure 1G:
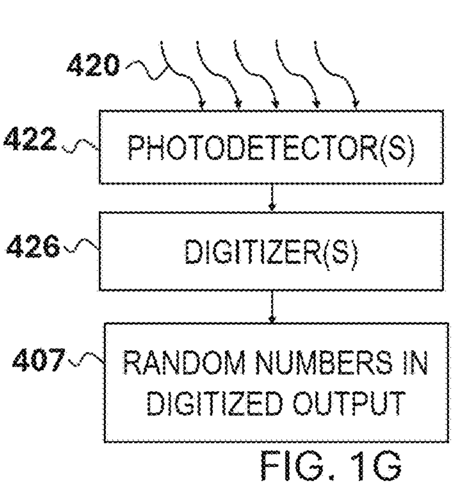
FIG. 1G shows a possible example of components which relate to the treatment of the photodetector response which may relate to some embodiments.

Referring to FIG. 1F, for some embodiments, the response of photodetector(s)/image sensor(s)/pixel(s) is further postprocessed (410) after digitization yielding postprocessed random numbers (412). This is because, for some embodiments, the response is (sufficiently) non-deterministic but may not be (sufficiently) uniformly distributed or completely uncorrelated. The response statistical properties are affected by the statistical characteristic of photon statistics which are usually not well-approximated by a uniform distribution (i.e., gaussian or Poissonian distributions for a population of photons or exponential distributions for inter-arrival times etc.). Furthermore, correlations can exist because of many reasons including but not limited to:

defects in photodetectors, pixels or image sensors,
non-uniformity in a set of photodetectors, pixels or image sensors,
non-uniformity in illumination,
a deterministic signal is summed with the non-deterministic signal,
additional sources of noise,
technical noise,
physical limitations,
empirical reasons or evidence,
any other suitable reason,
any variations and/or combinations thereof, etc.

For some embodiments, correlation and non-uniformity may be removed via postprocessing. In the cases of some embodiments, the distribution can be made close to that of an ideal uniform and uncorrelated random variable. For some embodiments, it may not be reasonably practicable to efficiently distinguish between an ideal random variable and the postprocessed output. The selection of postprocessing method is highly application specific or embodiment specific. A choice, for some embodiments, is made based on various application specific constraints such as available computational resources, data rate constraints, thermal and/or power constraints, cryptographic constraints, security level constraints, degree of statistical idealness, resource constraints, logic utilization and/or numbers of logic gates etc. Some embodiments may apply current, future or past methods of postprocessing random numbers. Some embodiments may not include any postprocessing. For some embodiments, postprocessing may comprise randomness extraction. Examples of randomness extractor utilized by some embodiments include but are not limited to: Von Neumann extractors (and variations thereof), multiplication of a random vector by a constant matrix, modular multiplication of a random vector by a constant matrix, Toeplitz hashing, universal hashing, cryptographic hash functions, sponge constructions, Trevisan's extractor, a process which takes an input bit vector of a particular length and entropy content per bit and produces a shorter bit vector wherein the entropy content per bit of the shorter/new bit vector is higher, a process which takes an input bit vector of a particular length and entropy content per bit and produces a shorter bit vector wherein the entropy content per bit of the shorter/new bit vector is or close to one bit per bit, current methods of randomness extraction, past methods of randomness extraction, future methods of randomness extraction, variations thereof, combinations thereof, etc. For some embodiments, a randomness extractor may produce less bits than it consumes. For some embodiments, the randomness extractor may exhibit a trade-off between the output bit vector length and the lower-bound on allowable entropy content per bit of the input bit vector. For some embodiments, postprocessing may comprise past, current or future implementations of pseudorandom functions. For some embodiments, postprocessing may comprise of one or more pseudorandom functions including but not limited to: block ciphers, stream ciphers, linear feedback shift registers, cyclic redundancy check calculations, hash functions, cryptographic hash functions, sponge construction, counter mode ciphers, mixing functions (mix functions), linear congruential generators, s-box functions, Mersenne twister, Blum Blum Shub, xorshift, xorshiro, Fibonacci generator, variations thereof, combinations thereof etc.

Figure 1H:
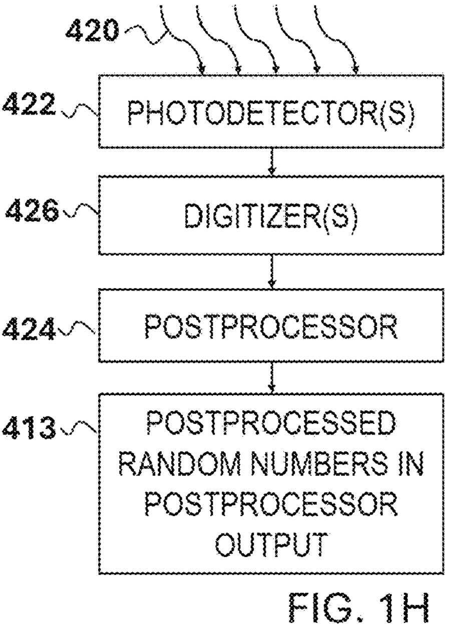
FIG. 1H shows another possible example of components which relate to the treatment of the photodetector response which may relate to some embodiments.

Referring to FIG. 1H, for some embodiments, postprocessing may be performed by a postprocessor (424) which may comprise any digital implementation technology adapted to apply postprocessing to random data. The postprocessed output may contain postprocessed random numbers (413), and/or other data. Digital implementation technologies are a means of implementing functionality which is partially or wholly digital, including, but are not limited to, PLDs (programable logic devices), ICs (integrated circuits), ASICs (application specific ICs), MCUs (microcontroller units), CPUs (central processing units), GPUs (graphics processing units), GPGPUs (general purpose GPUs), and related hardware. Some embodiments may comprise a GPU (graphics processing unit) adapted to process random numbers. Some embodiments may be implemented using at least one programable logic device (PLD). PLDs are any device which can be programmed at least once to implement, emulate or otherwise provide functionality equivalent to or approximating a logical circuit. PLDs include, but are not limited to, field gate programmable arrays (FPGAs), programmable logic, embedded FPGAs (eFPGAs), complex programmable logic devices (CPLDs), programmable logic arrays (PLAs), programmable array logic (PAL), advanced compute acceleration platforms (ACAPs), system-on-chips integrating programmable logic with a hardened processing subsystem, any device capable of emulating a logical circuit, and any device containing programmable logic fabric such as a microcontroller integrating one or more macrocells, look-up tables (or similar). Some embodiments may be implemented using one more integrated circuits, including but not limited to fully custom integrated circuits and application specific integrated circuits (ASICs). Hence, some embodiments may be agnostic towards the underlying digital implementation technology. This however does not preclude a particular embodiment from deriving advantage(s) from a particular digital implementation technology. Furthermore, some embodiments may be ported between digital implementation technologies without constituting a substantial variation of the disclosed embodiments. Changing the digital implementation technology to a technology listed or not listed above does not constitute a substantial variation of the disclosed embodiments. For some embodiments, the post processor may comprise a central processing unit coupled to computer readable non-transitory memory (wherein non-transistor implies that the memory is tangible (not a signal) and does not imply any limitations on the volatility or permanence of the memory), with program instructions stored thereupon which cause the central processing unit to postprocess the random numbers.

For some embodiments, when an image sensor comprising a set of pixels/photodetectors is illuminated, a subset of pixels/photodetectors are illuminated (meaning some pixels are non-illuminated). For some embodiments, when an image sensor comprising a set of pixels/photodetectors is illuminated, the full set of pixels/photodetectors are illuminated.

Referring to FIG. 1A-D, abbreviation LS means one or more light source(s) (including but not limited to a light source, an array of light source(s), a light source with multiple emitters/emitting elements etc.) and abbreviation PDET means one or more photodetector(s) including but not limited to a pixel or an array of pixels, an image sensor or a pixel of an image sensor, a photodetector or an array of photodetectors, multiple photodetectors etc. Referring to FIG. 1A-D, for some embodiments, one or more photodetector(s)/image sensor(s)/pixels of image sensor(s) (502) are illuminated by light (produced by one or more light source(s) (506)) entering (508) a non-opaque volume (510) (via at least one surface such a first surface (512)) which distributes light to one or more photodetectors (502) which are illuminated by light escaping from at least one surface such as a second surface (514). The illustrated brackets (504, 505, 520) on FIG. 1A-D indicate that there may be one or more of the photodetectors (502). For some embodiments, light may escape from a plurality of surfaces, (for a non-limiting example, an additional surface (516) other than the second surface). For some embodiments, this may accommodate additional photodetector(s) (518), of which there may be one or more (520). For some embodiments, light may enter (524) from a plurality of surfaces, (for a non-limiting example, an additional surface other than the first surface (526)). For some embodiments, this may accommodate additional light source(s) (522). There is no restriction on the arrangement of photodetector(s)/image sensor(s)/pixels of image sensor(s), for example there may be a one-dimensional arrangement (504), or additional rows creating a two-dimensional arrangement (505) with no limitation that individual rows or columns have the same number and/or spacing/arrangement of photodetector(s)/image sensor(s)/pixels of image sensor(s). The illustrated geometry of non-opaque volume (510) does not imply restrictions on the geometry of the non-opaque volume, nor does illustrated placement of light source(s) (506, 522) imply restrictions on the number or location of light source(s), nor does illustrated placement of photodetector(s) (502, 504, 505, 518) imply restrictions on the number or location of photodetector(s), nor does illustrated surface(s) where light enters (512, 526) imply a restriction on the number or location of surface(s) where light enters, nor does illustrated surface(s) where light exits (514, 516) imply a restriction on the number or location of surface(s) where light exits, etc. For a volume to be considered non-opaque, at least some portion of the range of wavelengths in which the respective embodiment operates, the degree of optical extinction is low enough to enable the embodiment to be operable. For some embodiments, a non-opaque volume may comprise some region of optical free space (including but not limited to vacuum, air, or gas). For some embodiments, a non-opaque volume may comprise at least one non-opaque material including but not limited to:

- non-opaque plastics or polymeric materials (including but not limited to, polycarbonates, polymethyl methacrylates, polypropylenes, polystyrenes, polyethylene terephthalates, polyphenylene ether sulfones, polysulfones, polyether sulfones, polyallyl diglycol carbonates, polyethylenes, polymethyl pentenes, polyolefins, polyesters, polyamides, polyimides, silicones, copolymer variants thereof, variations thereof, combinations thereof etc.),
- non-opaque crystalline materials (including but not limited to, quartz, sapphire, diamond, fluorides, nitrides, silicon, wide-bandgap semiconductors, variations and/or combinations thereof etc.),
- non-opaque amorphous or glassy materials (including but not limited to, glasses, silicate glasses, borosilicate glasses, soda lime glasses, crown glasses, halogenide glasses, chalcogenide glasses, fused silica, compositional variants thereof, variations and/or combinations thereof etc.)
- non-opaque fluids (including but not limited to, water, oils, olefins, silicones, fluorocarbons, perfluorocarbons, paraffins, ethers, perfluoropolyether, synthetic oils, natural products, naturally occurring oils, variations and/or combinations thereof etc.)

Light may be emitted from at least one light source. The emitted light enters the non-opaque volume through at least one surface of the non-opaque volume. For some embodiments, the surface(s) of the non-opaque volume partially or fully confine light within the volume. For some embodiments, at least one surface of the volume reflects light interior to the volume thus enabling the propagation of light through the volume via reflection of light rays or photons within the volume. Such surface(s) may be made reflective or partially reflective in ways including but not limited to: total internal reflection, partial internal reflection, reflective material(s) placed on the surfaces of the non-opaque volume, reflective film(s) placed on the surfaces of the non-opaque volume, reflective treatments applied to the surface of the non-opaque volume or any combination thereof. Non-limiting examples may include making any of the illustrated surfaces (512, 514, 516, 526, 528, 530) etc. reflective or partially reflective. Non-limiting examples of reflective or partially reflective treatments may include any combination of: a difference in refractive index at the surface boundary, reflective paint, metallization or metallic coating, metalized polymeric film, metal foil, mirrored finish/coating, dielectric reflective coating, paper reflector, reflective ink, reflective resin, opaque plastic, opaque resin, glass reflector, metallic plate, etc. For some embodiments, there may be surface(s) orientated towards photodetector(s) and/or image sensor(s) allowing transmission of some light such that some light is emitted onto the photodetector(s) and/or image sensor(s) (non-limiting examples may include oriented surfaces (514, 516)).

For some embodiments, the non-opaque volume may comprise of a body with a higher refractive index than the immediate environment. For some embodiments, the non-opaque volume may comprise of a hollow structure with reflective interior surface(s) to assist light propagation as described.

For some embodiments, the light source(s) and photodetector(s)/image sensor(s) may be mounted on the same substrate. For some embodiments, the light source(s) and photodetector(s)/image sensor(s) may be mounted on different substrates. For some embodiments, light source(s) and photodetector(s)/image sensor(s) may lie in the same plane or approximately the same plane. For some embodiments, light source(s) and photodetector(s)/image sensor(s) do not lie in the same plane or approximately the same plane. For some embodiments, light source(s) and photodetector(s)/image sensor(s) may lie in parallel planes. For some embodiments, light source(s) and photodetector(s)/image sensor(s) do not lie in parallel planes.

For some embodiments, the surface(s) of the non-opaque volume where light enters the volume, and the surface(s) of the non-opaque volume where light exits in order to illuminate photodetector(s)/image sensor(s), do not lie in the same plane or approximately the same plane. For some embodiments, the surface(s) of the non-opaque volume where light enters the volume, and the surface(s) of the non-opaque volume where light exits in order to illuminate photodetector(s)/image sensor(s), may lie in the same plane or approximately the same plane. Surfaces lie in approximately the same plane if merely a small displacement is preventing the surfaces from lying in the same plane (which might arise for reasons including but not limited to, a difference in size or thickness between light source(s) and photodetector/images sensor(s), mechanical constraints arising from fixing light source(s) and/or photodetector(s)/image sensor(s), introducing a displacement that is not the result of a deliberate design intent, introducing a displacement that is of negligible optical significance, etc.). If the displacement is relatively large and/or if it is optically significant/impactful and/or if there is deliberate design intent to introduce the displacement, then it may not be correct to characterize the displacement surfaces as lying in approximately the same plane. If the displacement is introduced by an interposed optical component or feature, then the surfaces do not lie in approximately the same plane and the interposed component or feature ensures that the displacement is optically significant. If photodetector(s)/image sensor(s) and light source(s) are mounted or fixed on the same plane and this plane contacts (is coincident with) or lies against a surface of the non-opaque volume, then the surfaces where light enters/exits may lie in approximately the same plane. If photodetector(s)/image sensor(s) and light source(s) are mounted or fixed on the same plane (or affixed upon a common planar substrate, or integrated into a common planar material), then the photodetector(s)/image sensor(s) and light source(s) lie in the same plane. Surfaces lying in approximately the same plane refers to a superset of surfaces lying in the same plane meaning that if surfaces lie in the same plane, then they also lie in approximately the same plane. If surfaces lie in the same plane (or approximately the same plane) then they also lie in parallel planes. For some embodiments, the surface(s) of the non-opaque volume where light enters the volume, and the surface(s) of the non-opaque volume where light exits in order to illuminate photodetector(s)/image sensor(s) do not lie in parallel planes. For some embodiments, the surface(s) of the non-opaque volume where light enters the volume, and the surface(s) of the non-opaque volume where light exits in order to illuminate photodetector(s)/image sensor(s), may lie in parallel planes.

Figures 2A, 2B, 2C:
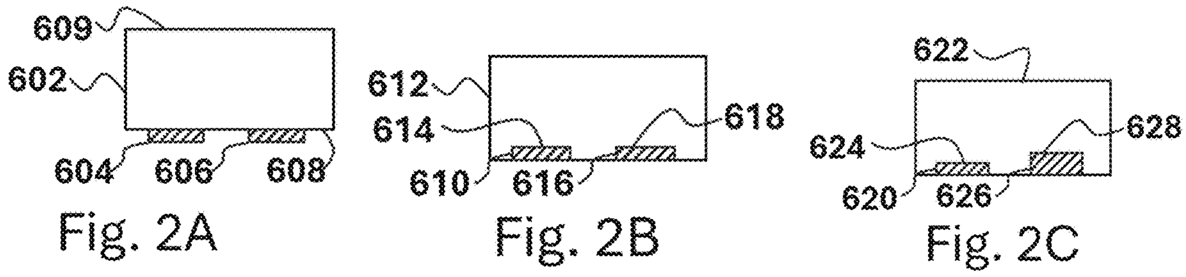
FIGS. 2A-E shows various non-limiting example configurations of non-opaque volume(s), photodetector(s) and light source(s) (cross section views, not to scale) which may relate to some embodiments.

In an illustrative non-limiting example illustrated by FIG. 2A, light source(s) (604) emit light into non-opaque volume (602) via a surface (608), and light exits illuminating photodetector(s)/image sensor(s)/pixel(s) of image sensor(s) (606) via a surface (608). Hence, the surface(s) where light enters and exits lie in the same plane, and the surface(s) where light enters and exits lie in parallel planes. Furthermore, the geometry of the non-opaque volume comprises a pair of non-coincident parallel planes (608, 609). Light source(s) (604) and photodetector(s)/image sensor(s)/pixel(s) of image sensor(s) (606) lie in the same plane. The surface where light enters (608) lies in the same or approximately the same plane as a surface where light exits (606).

In an illustrative non-limiting example illustrated by FIG. 2B, light source(s) (610) emit light into non-opaque volume (612) via a surface (614), and light exits illuminating photodetector(s)/image sensor(s)/pixel(s) of image sensor(s) (616) via a surface (618). Hence, the surface(s) where light enters and exits lie in the same plane, and the surface(s) where light enters and exits lie in parallel planes. Light source(s) (610) and photodetector(s)/image sensor(s)/pixel(s) of image sensor(s) (616) lie in the same plane. The surface where light enters (614) lies in the same or approximately the same plane as a surface where light exits (616).

In an illustrative non-limiting example illustrated by FIG. 2C, light source(s) (620) emit light into non-opaque volume (622) via a surface (624), and light exits illuminating photodetector(s)/image sensor(s)/pixel(s) of image sensor(s) (626) via a surface (628). Hence, the surface(s) where light enters and exits lie in approximately the same plane (since the surfaces where light enters (628) and exits (624) are slightly displaced by the different thicknesses of light source(s) (620) and photodetector(s) (626)), and the surface(s) where light enters and exits lie in parallel planes. Light source(s) (620) and photodetector(s)/image sensor(s)/pixel(s) of image sensor(s) (626) lie in the same plane as there is a common substrate and/or photodetectors (626) and light source(s) (620) are affixed to the same plane. The surface where light enters (624) lies in the same or approximately the same plane as a surface where light exits (626).

Figure 2D:
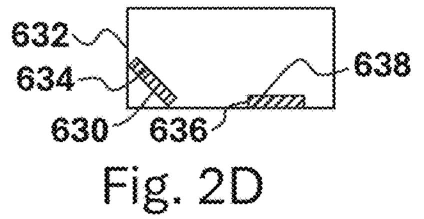

In an illustrative non-limiting example illustrated by FIG. 2D, light source(s) (630) emit light into non-opaque volume (632) via a surface (634), and light exits illuminating photodetector(s)/image sensor(s)/pixel(s) of image sensor(s) (636) via a surface (638). Hence, the surface(s) where light enters and exits do not lie in the same plane, and the surface(s) where light enters and exits do not lie in parallel planes. Light source(s) (630) and photodetector(s)/image sensor(s)/pixel(s) of image sensor(s) (636) do not lie in the same plane. The surface where light enters (634) does not lie in the same or approximately the same plane as a surface where light exits (636).

Figure 2E:
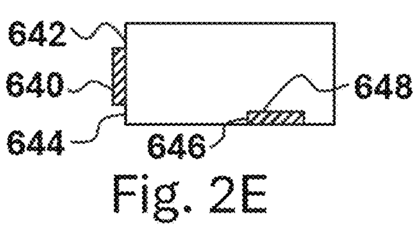

In an illustrative non-limiting example illustrated by FIG. 2E, light source(s) (640) emit light into non-opaque volume (642) via a surface (644), and light exits illuminating photodetector(s)/image sensor(s)/pixel(s) of image sensor(s) (646) via a surface (648). Hence, the surface(s) where light enters and exits do not lie in the same plane, and the surface(s) where light enters and exits do not lie in parallel planes. Light source(s) (640) and photodetector(s)/image sensor(s)/pixel(s) of image sensor(s) (646) do not lie in the same plane. The surface where light enters (644) does not lie in the same or approximately the same plane as a surface where light exits (646).

Figures 2F, 2G, 2H:
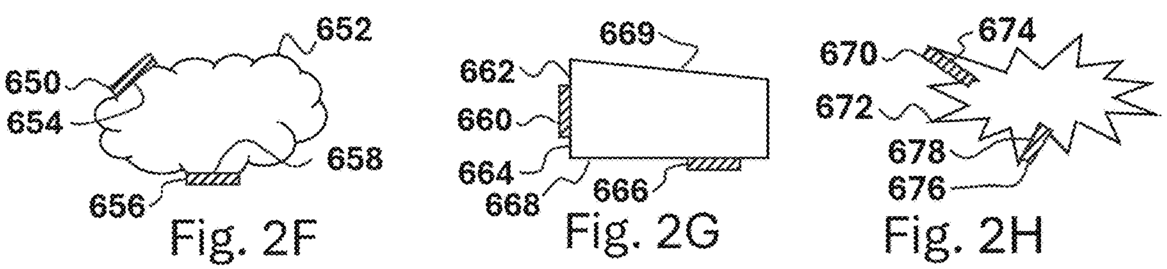
FIG. 2F shows various non-limiting example configurations of non-opaque volume(s), photodetector(s) and light source(s) (cross section views, not to scale) which may relate to some embodiments wherein the geometry of the non-opaque volumes(s) is complex or arbitrary.
FIG. 2G shows various non-limiting example configurations of non-opaque volume(s), photodetector(s) and light source(s) (cross section views, not to scale) which may relate to some embodiments wherein a surface of the non-opaque volume(s) is angled towards the other.
FIG. 2H shows various non-limiting example configurations of non-opaque volume(s), photodetector(s) and light source(s) (cross section views, not to scale) which may relate to some embodiments wherein the geometry of the non-opaque volumes(s) is complex or arbitrary.

In an illustrative non-limiting example illustrated by FIG. 2F, light source(s) (650) emit light into non-opaque volume of arbitrary or complex geometry (652) via a surface (654), and light exits illuminating photodetector(s)/image sensor(s)/pixel(s) of image sensor(s) (656) via a surface (658). Hence, the surface(s) where light enters and exits do not lie in the same plane, and the surface(s) where light enters and exits do not lie in parallel planes. Light source(s) (650) and photodetector(s)/image sensor(s)/pixel(s) of image sensor(s) (656) do not lie in the same plane. The surface where light enters (654) does not lie in the same or approximately the same plane as a surface where light exits (656).

In an illustrative non-limiting example illustrated by FIG. 2G, light source(s) (660) emit light into non-opaque volume (662) via a surface (664), and light exits illuminating photodetector(s)/image sensor(s)/pixel(s) of image sensor(s) (666) via a surface (668). Hence, the surface(s) where light enters and exits do not lie in the same plane, and the surface(s) where light enters and exits do not lie in parallel planes. Furthermore, the geometry of the non-opaque volume (662) is constructed by taking a pair of parallel planes, one of which is surface for example the surface where light exits (668), and angling one plane towards the other to give another surface (669). Light source(s) (660) and photodetector(s)/image sensor(s)/pixel(s) of image sensor(s) (666) do not lie in the same plane. The surface where light enters (664) does not lie in the same or approximately the same plane as a surface where light exits (666).

In an illustrative non-limiting example illustrated by FIG. 2H, light source(s) (670) emit light into non-opaque volume of arbitrary or complex geometry (672) via a surface (674), and light exits illuminating photodetector(s)/image sensor(s)/pixel(s) of image sensor(s) (676) via a surface (678). Hence, the surface(s) where light enters and exits do not lie in the same plane, and the surface(s) where light enters and exits do not lie in parallel planes. Light source(s)

(670) and photodetector(s)/image sensor(s)/pixel(s) of image sensor(s) (676) do not lie in the same plane. The surface where light enters (674) does not lie in the same or approximately the same plane as a surface where light exits (676).

Figure 2I:
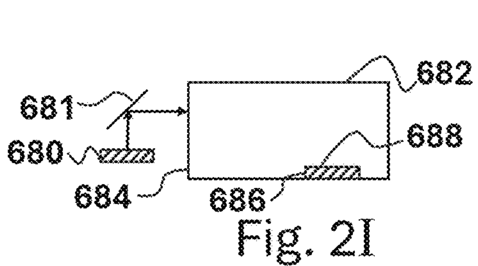
FIG. 2I shows various non-limiting example configurations of non-opaque volume(s), photodetector(s) and light source(s) (cross section views, not to scale) which may relate to some embodiments wherein there is an interposed reflector (or otherwise) or other optics between the light source and the non-opaque volume.

In an illustrative non-limiting example illustrated by FIG. 2I, light source(s) (680) emit light into non-opaque volume (682) via a surface (684) as directed by additional reflector (681), and light exits illuminating photodetector(s)/image sensor(s)/pixel(s) of image sensor(s) (686) via a surface (688). Hence, the surface(s) where light enters and exits do not lie in the same plane, and the surface(s) where light enters and exits do not lie in parallel planes. Whether or not photodetector(s) (686) and light source(s) (680) lie in the same or approximately the same plane depends on the position of these elements. It is possible to position light source(s) (680) and photodetector(s) (686) so that they lie in the same plane, for example (non-limiting), by mounting/affixing both to the same substrate. It is possible to position light source(s) (680) and photodetector(s) (686) so that they do not lie in the same plane, for example (non-limiting), by mounting/affixing both to different substrates and/or a non-planar substrate(s). The surface where light enters (684) does not lie in the same or approximately the same plane as a surface where light exits (688).

Figure 2J:
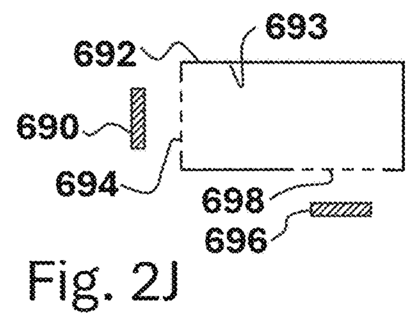
FIG. 2J shows various non-limiting example configurations of non-opaque volume(s), photodetector(s) and light source(s) (cross section views, not to scale) which may relate to some embodiments wherein the non-opaque volume comprises optical free space.

In an illustrative non-limiting example illustrated by FIG. 2J, light source(s) (690) emit light into non-opaque volume comprising optical free space (692) enclosed by interior reflective surface(s) (693) via a surface which is a window or opening (694) into the volume, and light exits illuminating photodetector(s)/image sensor(s)/pixel(s) of image sensor(s) (696) via a surface which is a window or opening into the volume (698). Hence, the surface(s) where light enters and exits do not lie in the same plane, and the surface(s) where light enters and exits do not lie in parallel planes. Light source(s) (690) and photodetector(s)/image sensor(s)/pixel(s) of image sensor(s) (696) do not lie in the same plane. The surface where light enters (694) does not lie in the same or approximately the same plane as a surface where light exits (696).

For some embodiments, which have geometry (ies) characterized as any of the following:

- Light enters the non-opaque volume through one or more surfaces wherein these surfaces do not lie in the same plane (or approximately the same plane) as the photodetector(s)/image sensor(s).
- Light enters the non-opaque volume through one or more surfaces wherein these surfaces do not lie in the same plane (or approximately the same plane) as the surface(s) where light exits the non-opaque volume to illuminate. photodetector(s)/image sensor(s).
- Light enters the non-opaque volume through one or more surfaces wherein these surfaces do not lie in a plane parallel to a plane in which photodetector(s)/image sensor(s) lie.
- Light enters the non-opaque volume through one or more surfaces wherein these surfaces do not lie in a plane parallel to a plane in which surface(s) where light exits the non-opaque volume to illuminate photodetector(s)/image sensor(s) lie.
- The photodetector(s)/image sensor(s) do not lie in a plane parallel to the plane or surface in which the light source(s) lie.
- The photodetector(s)/image sensor(s) do not lie is the same (or approximately the same plane) as the plane in which the light source(s) lie.

These geometries may allow light to propagate a longer distance in the direction parallel to the plane of photodetector(s)/image sensor(s) or the plane of the surface(s) where light exits to illuminate the photodetector(s)/image sensor(s). Since more light propagates to parts of the non-opaque volume which are further away from where light enters, this may improve or contribute towards a uniform (or more uniform) illumination pattern over the area of photodetector(s)/image sensor(s) which are illuminated. The reasons for this may include (but are not limited to) any combination of:

- This geometry may increase the fraction of light entering the non-opaque volume which strikes the interior surface of the non-opaque volume at (relatively) high angle of incidence.
- For embodiments where surface reflectivity is mainly due to a difference in refractive index at the surface/boundary, reflectivity is maximized when the angle of incidence exceeds the critical angle. Below the critical angle, the reflectivity of such a surface may reduce rapidly meaning that only (or mostly) light striking at a relatively high angle of incidence may be efficiently reflected. This may, for some embodiments, improve light propagation which may improve or contribute towards a uniform (or more uniform) illumination pattern over the area of photodetector(s)/image sensor(s) which are illuminated.
- The higher angle of incidence, resulting from this geometry, reduces the number of times a light ray or photon may be reflected in order propagate a given distance. Since reflection may not be 100% efficient (due to transmission, absorption, extinction etc.), reducing the number of reflections reduces losses of light propagating in the volume which arise from reflection. As losses contribute to non-uniformity of the illumination pattern, reducing losses may (for some embodiments) improve light propagation which may improve or contribute towards a uniform (or more uniform) illumination pattern over the area of photodetector(s)/image sensor(s) which are illuminated. This applies regardless of whether the dominant means of reflection is due to a reflective treatment applied to a surface or the result of a difference in reflective index at the surface/boundary or a different means.
- A greater fraction of light is entering the non-opaque at an angle amicable for propagation.
- A greater fraction of entering light is propagating in directions that are or near parallel to the plane(s) or surface(s) where light exits.

For some embodiments, such as those characterized by improved uniformity of the illumination, the improved uniformity of illumination leads to more consistent illumination of photodetectors/image sensor(s)/pixels of image sensor(s). This may lead to more consistent statistical characteristics of the response produced by such photodetectors or image sensors or pixels of image sensor(s). For some embodiments, this may improve statistical characteristics of the generated random numbers. For some embodiments, this may result in more consistent characteristics prior to post-processing.

There are various ways for light to reflect off a surface. Directional reflection is when an incident light ray is reflected such that the angle of the reflected ray is equal to the angle of the incident ray (wherein angles are measured from the normal to the surface at the point of incidence). Diffuse reflection, in contrast to directional is when light is reflected from the surface at many directions instead of a specific direction. For an ideal diffuse reflector, the reflected light has a Lambertian distribution, meaning that light is reflected in many (or a range of) directions as per the Lambertian distribution. Spread reflection, is like diffuse reflection, except reflected rays are limited to a range of angles centered on a particular axis wherein the angle of this axis to the surface normal equals the angle of incidence. Furthermore, the different types of reflection can be mixed, for example, a particular surface or material may exhibit mixed direction and diffuse reflection, mixed directional and spread reflection, mixed spread and diffuse reflection, or a mixture of the three modes. Thus, to simplify discussion about reflection, the concept of the degree of directionality is introduced. Degree of directionality qualitatively or quantitatively describes the extent or degree to which reflection from a surface favors one or more directions or a range of directions. Directional reflection has maximum degree of directionality since incident light is reflected in one direction (determined by angle of incidence). Ideal diffuse (Lambertian) reflection has the minimum degree of directionality since light is reflected in many possible directions, without preference for a direction, as determined by a Lambertian distribution. For non-ideal diffuse reflection, there is a degree of directionality between that of ideal diffuse and directional reflection as the intensity of reflected rays in particular directions may be enhanced (relative to a Lambertian distribution) yet without being confined to a single direction. Hence, spread reflection and mixed modes of reflection have intermediate degrees of directionality. Conversely, we may also consider a degree of non-directionality. This is the same concept as the degree of directionality, except directional reflectors have the lowest possible degree of non-directionality and ideal diffuse reflectors have the highest possible degree of non-directionality.

A reflector with a high degree of directionality may be created by ensuring that the surface is smooth. Some materials may exhibit non-directional reflections even when smooth (this may be due to optical properties and/or microstructure of the material). One way to create mixed or spread reflections, which may be employed by some embodiments is to ensure that a diffuse reflector is sufficiently smooth for a portion of the incident light to be reflected directionally. One way to create mixed or spread reflections, which may be employed by some embodiments is to place a diffuse reflector behind the surface of the non-opaque volume which produces directional reflections (for example, this may be due to a refractive index difference or otherwise, etc.). This may result in a mixture of reflection modes thus produce an intermediate degree of directionality. For some embodiments, the degree of directionality of a surface may be reduced by treating a surface of a non-opaque volume such that it increases surface roughness. For some embodiments, the degree of directionality of a surface may be reduced by treating a surface with a coating, ink, dye, resin etc.

Some embodiments may have non-opaque volume(s) with one or more interior surface(s) which produce reflections with a high degree of directionality. Some embodiments may have non-opaque volume(s) with one or more interior surface(s) which produce reflections wherein some reflections may be characterized as having some degree of non-directionality. This non-directionality may cause light to strike surface(s) at a lower angle of incidence. This may enable or assist light to escape surface(s) thus illuminating one or more photodetectors/image sensors for reasons including but not limited to: light striking the surface(s) at a higher angle of incidence may require more reflections to propagate the same distance through the non-opaque volume thus providing more opportunity for light to escape, for some embodiments at lower angle of incidence the reflectivity of the surface(s) reduces while transmissivity increases allowing for more light to escape (particularly for embodiments where reflectivity is mainly the result of a difference in refractive index). For some embodiments, this may contribute towards improving the uniformity of the illumination pattern. For some embodiments, this may result in the spreading of light which may improve or contribute toward improving the uniformity of illumination. For some embodiments, the degree of non-directionality may be high (close to that of an ideal diffuse reflector), low (near to that of a directional reflector) or some intermediate degree.

Figure 3:
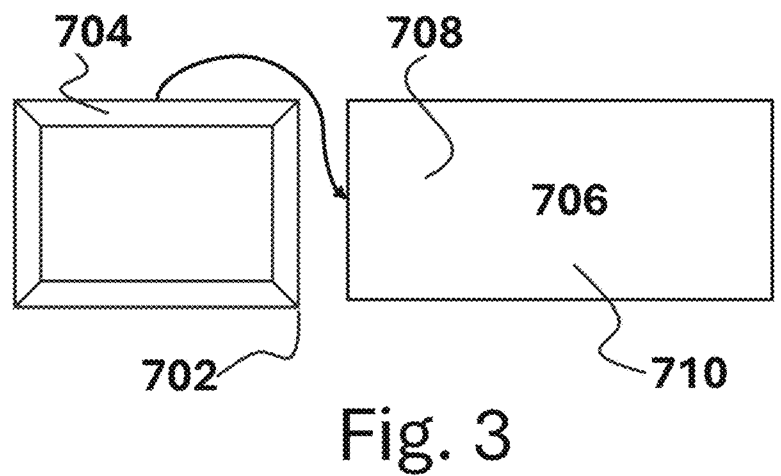
FIG. 3 shows a non-limiting example (or conceptual representation) of an interior surface of a non-opaque volume wherein at particular points, the degree of directionality is different (when comparing the selected points) which may apply to some embodiments.

Some embodiments may vary the degree of (non-) directionality on at least one surface of the non-opaque volume such that different points of the surface or reflector may have different degrees of directionality. Such a surface or reflector may be referred to as a varied directionality reflector or varied directionality surface. For a non-limiting illustrative example, as shown by FIG. 3, there is a non-opaque volume (702) with a reflective interior surface (704), of which a section (706) of the interior side is drawn, we may select a pair of points (such as first point (708) and a second point (710)) such that the degree of directionality is different at these points. The illustration of first point (708) and second point (710) does not express any particular geometric relationship between the first and second point. The illustration does not illustrate any particular geometry of the surface (704) or section (706). For some embodiments, varied directionality may be implemented by printing, etching, engraving, cutting, applying, patterning or otherwise inducing optical variation on a film, sheet, material, plate, surface, coating etc. which is subsequently applied to or placed against at least one surface of the non-opaque volume. For some embodiments, a varied directionality is created by printing, etching, engraving, cutting, applying, patterning or otherwise inducing optical variation directly onto a surface of the non-opaque volume. For some embodiments, an additional reflector or reflective material may be placed behind a varied directionality surface. For some embodiments, no additional reflector or reflective material may be placed behind the varied directionality surface. For some embodiments, a varied directionality surface or reflector may be formed by patterning an adhesive which is used to attach a reflective material (or film, film, sheet, plate, surface, coating etc.) to the reflector surface as the adhesive may modify the directionality of the reflector by affecting the optical coupling between the surface and the attached material. For a non-limiting example, if the attached material has a diffusely reflective surface, then areas with adhesive may allow light within the non-opaque volume to interact more effectively with the attached material thus leading to a lower degree of directionality where the adhesive is placed. Whereas areas of the attached material without adhesive applied may be less strongly optically coupled so the attached material may have less influence on reflectivity in these areas. For some embodiment, the adhesive may itself interact with light thereby altering the degree of directionality.

Some embodiments may vary the degree of directionality by varying the surface roughness of a reflector or surface of a non-opaque volume. For some embodiments, the change in surface roughness may be graded or abrupt. For some embodiments, examples of methods for controlling surface roughness may include (but are not limited to): sanding, polishing, embossing, impressing, texturing, patterning, etching, engraving, grinding, wire brushing, ablating, bead/ sand/particle/ball blasting, solvent polishing, vapor polishing, laser ablation, laser engraving, variations thereof, combinations thereof, any future method etc. Some embodiments may vary the degree of directionality by varying the surface texture of a reflector or surface of a non-opaque volume. For some embodiments, the change in surface texture may be graded or abrupt. Some embodiments may vary the degree of directionality by varying the opacity of a surface treatment applied to or placed on a reflector or surface of a non-opaque volume. For some embodiments, the change in opacity or surface treatment may be graded or abrupt. Some embodiments may vary the degree of directionality by varying the opacity of a material (or film, film, sheet, plate, surface, coating etc.) applied to or placed on a reflector or surface of a non-opaque volume. For some embodiments, the change in opacity or material (or film, film, sheet, plate, surface, coating etc.) may be graded or abrupt. Some embodiments may vary the degree of directionality by varying the reflectivity of a surface treatment applied to or placed on a reflector or surface of a non-opaque volume. For some embodiments, the change in reflectivity or surface treatment may be graded or abrupt. Some embodiments may vary the degree of directionality by varying the reflectivity of a material (or film, film, sheet, plate, surface, coating etc.) applied to or placed on a reflector or surface of a non-opaque volume. For some embodiments, the change in reflectivity of the material (or film, film, sheet, plate, surface, coating etc.) may be graded or abrupt.

For some embodiments, a varied directionality reflector or surface is characterized by regions of varying degree of directionality which are defined by taking one or more plane figure(s) and using a space filling method to fill the surface with plane figure(s). Filled regions, areas covered by plane figures, may exhibit a different degree of directionality to regions that are un-filled (areas not covered by plane figures including areas around plane figures). Thus, there are at least two (a plurality of) points on such a surface which may have different degrees of directionality. Some embodiments may use a single plane figure whereas some embodiments may use multiple distinct plane figures. However, the exact choice of plane figure(s) is sometimes inconsequential for some embodiments, and some embodiments are agnostic of the exact choice of plane figure(s). Likewise, the exact choice of space filling method(s) is sometimes inconsequential for some embodiments, and some embodiments are agnostic of the exact choice of space filling method(s). This however does not preclude that a particular embodiment may derive some advantage from particular space filing method(s) and/or plane figure(s). Some embodiments may utilize one-dimensional space filling which comprises translating the plane figure(s) by some distance along an axis until the surface is filled to sufficient density. Some embodiments may utilize two-dimensional space filling which comprises translating the plane figure(s) in two-dimensional space until the surface is filled to sufficient density. Some embodiments may utilize one- or two-dimensional space filling such that the filling density of approximately constant on average. Some embodiments may utilize a particular case of two-dimensional space filling which comprises randomly distributing plane figure(s) over the surface until a sufficient filling density is reached. Some embodiments may utilize a particular case of two-dimensional space filling which comprises constructing one or more unit cell(s) from the plane figure(s) and repeating (tessellating or translating) the unit cell(s) to fill the surface. Non-limiting examples of unit cells include rectangular, centered rectangular, oblique, hexagonal, and square unit cells etc., wherein plane figure(s) may be placed at any point(s) within the unit cell (including, but not limited to, any combination of: at the centroid, at vertex/vertices, along edge(s), centered on edge(s), bisecting edge(s) or diagonals, any other point etc.). Some embodiments may utilize a particular case of two-dimensional space filling which comprises the use of a quasi-crystalline arrangement (including but not limited to: a Penrose lattice etc.) of plane figure(s). The space interior to the plane figure(s) is filled and the non-interior space non-filled or vice versa. For some embodiments, the filled regions of the surface or reflector reduced degree of directionality (increased degree of non-directionality) relative to non-filled regions. For some embodiments, the filled regions of the surface or reflector increased degree of directionality (reduced degree of non-directionality) relative to non-filled regions.

For some embodiments, controlling the filling density (the fraction of area which is filled) may enable some embodiments to control the fraction or amount of reflection which is characterized as having some degree of non-directionality. For some embodiments, reflections which are characterized as having some degree of non-directionality may result in light striking a surface (or reflector) of the non-opaque value at a lower angle of incidence. For some embodiments, this may enable light to escape the non-opaque volume for reasons including but not limited to:

- when light strikes an interior surface of the non-opaque volume at a relatively low angle of incidence the number of reflections for the light to propagate a given distance is increased compared to a high angle of incidence thus providing a larger opportunity for light to escape,
- for embodiments where a significant component of reflectivity is due to a difference of refraction indices at the surface/boundary then transmissivity may be increased (and reflectivity reduced) at low angles of incidence thus allowing more light to escape the non-opaque volume.

For some embodiments this may enable a degree of influence over the way light exits a non-opaque volume. For some embodiments this may enable control over the amount of that light exits a non-opaque volume. For some embodiments, the non-directional reflection introduced by a varied directionality reflector or surface may have the effect of spreading light thus resulting in or contributing towards a uniform (or more uniform) illumination pattern. For some embodiments, controlling the escape of light from the non-opaque volume (such as via a varied directionality reflector or surface) may result in or contribute towards a uniform (or more uniform) illumination pattern.

For some embodiments, including those which employ a varied directionality reflector or surface which is characterized by a filling density, the filling density may not be constant but is varied throughout the surface. The variation of filling density, for some embodiments, may be either continuous, discontinuous or combinations thereof. Since the filling density may affect the fraction of reflections which are characterized as having some degree of non-directionality this, for some embodiments, may allow control of the ability of light to exit particular parts of the non-opaque volume. For a non-limiting example, altering filling density such that there is an increased fraction of reflections having some degree of non-directionality may increase the ability of light to escape from the altered area. For a non-limiting example, altering filling density such that there is a reduced fraction of reflections having some degree of non-directionality may reduce the ability of light to escape from the altered area. For some embodiments, this effect may be employed to provide a uniform (or more uniform) illumination pattern. For some embodiments, this may be achieved by locating the local or global extrema (or extremum) of the filling density at or near designated regions. Designated regions may comprise any combination of:

- the areas which are approximately closest to or furthest from the light source(s) entering the respective non-opaque volume,
- the areas approximately corresponding to local or global extrema of the light intensity distribution within the respective non-opaque volume,
- the areas where it is desirable to increase the amount or proportion of reflection characterized as having some degree of non-directionality,
- the areas where it is desirable to increase the amount or proportion of reflection characterized as having some degree of directionality,
- the areas where it is desirable to increase the degree of directionality,
- the areas where it is desirable to reduce the degree of directionality,
  - the areas where it is desirable to increase the average or effective degree of directionality,
  - the areas where it is desirable to reduce the average or effective degree of directionality.

For some embodiments, designated regions also comprise areas identified by comparison with a non-opaque volume utilizing a varied directionality reflector/surface with uniform filling density or a regular reflector/surface (not employing varied directionality) wherein the designated regions comprise the areas where the illumination intensity is higher or lower than the intended value/limits or average value. For some embodiments, local variations of the filling density are achieved by locally modifying the placement, distribution, or characteristics of the plane figures. Illustrative examples of strategies that may be applied to vary the filling density include but are not limit to:

- varying the size, aspect ratio, area or combinations thereof of the plane figure(s),
- by choosing or introducing different plane figure(s) to produce a different density,
- by varying the mix of or relative proportions of different plane figure(s) to produce a different density,
- by varying the number density of plane figure(s),
- by varying the spacing(s) of plane figure(s),
- by varying the unit cell of plane figure(s),
- any variation of the aforementioned,
- any combination thereof.

Examples of plane figures include (but are not limited to): squares, quadrilaterals, rectangles, parallelograms, trapezoids, triangles, polygons, circles (and sectors/segments thereof), ellipsoids (and sectors/segments thereof), arbelos, annular variations thereof, variations thereof, hybrids or combinations thereof, angular version thereof, simply connected two-dimensional plane figures, two-dimensional plane figures that are not simple connected, etc.

For some embodiments, one or more surfaces of the non-opaque volume may include any combination of occlusions, particulates, texture(s), and/or embedded structures differentiated in refractive index and/or opacity from the surrounding material. The distribution of such features may be random, orderly, or the result of applying a space filling method. Examples include, but are not limited to: depositing particulates on a surface of uniform or non-uniform concentration, introducing irregularities into the surface, introducing additional material(s) with distinct refractive indexes or opacities on the surface, stamping or molding texture(s) onto the surface, roughening or texturing a surface etc. For some embodiments, this may result in at least one surface becoming a varied directionality reflector.

For some embodiments, the geometry of the non-opaque volume may comprise at least two surfaces which are arranged such that light can be reflected from one surface onto the other and vice versa. For some embodiments, photons may be reflected repeatedly between such surfaces which may enable light to propagate through the non-opaque volume. Some non-limiting examples, which may apply to some embodiments, may include repeated reflections between pairs of surfaces such as any of: a surface (528) and another surface (514), a surface (514) and another surface (516), a surface (608) and another surface (609), a surface (668) and another surface (669) etc. (and this does not imply any limitation on the geometry of the non-opaque volume(s), nor any limitation on which surfaces or pairs thereof are reflective). For some embodiments, the at least two surfaces may exhibit a high degree of directionality. Hence, the path of photons reflected repeatedly between the surfaces is such that the angle of incidence equals the angle of reflection. If the bulk of the non-opaque volume does not substantially scatter light, as applies to some embodiments, then the path of the photon is largely not affected by scattering events in the bulk which may randomize the path of the photon. The bulk of a non-opaque volume may refer to any portion of a non-opaque volume other than a surface of the volume. If the photon is reflected between parallel surfaces, as applies to some embodiments, the angle of incidence and reflection remains the same across reflections of the photon (whereby, for some embodiments, this could assist or contribute towards light propagating further from the surface where light enters). If the bulk of the non-opaque volume scatters light, as applies to some embodiments, then the path of the photon may be randomized due to the scattering events which occur in the bulk. This also randomizes the angle of incidence across reflections (whereby, for some embodiments, smaller angles of incidence may increase the probability of the photon escaping the non-opaque volume). For some embodiments, the at least two surfaces may exhibit a poor/low degree of directionality (high degree of non-directionality). Hence, the path of photons reflected repeatedly between the surfaces is randomized since the angle of reflection for the photon is random (or thereabouts) due to the high degree of non-directionality of reflections (whereby, for some embodiments, this could assist the spreading of light). The angle of incidence may also be randomized (whereby, for some embodiments, this could assist light to escape from a surface of the non-opaque volume). For some embodiments, at least one of the at least two surfaces exhibit a high and low degree of directionality respectively (or thereabouts). Thus, the high degree of directionality surface reflects photons such that the angle of incidence equals the angle of reflection, whereas the low degree of directionality surface may randomize the angle of reflection which may randomize the path of the photon and the angle of incidence (whereby, for some embodiments, this could assist the spreading of light and/or assist light to escape the non-opaque volume). For some embodiments the surfaces have an intermediate degree of directionality, meaning that the path of photons are may be randomized, but some directionality of reflection may be preserved meaning that photon paths or behaviors may be an intermediate between the cases of high and low degree of directionality (whereby, for some embodiments, this may balance the ability for light to propagate through and escape the non-opaque volume). For some embodiments, at least one of the at least two surfaces may be a varied directionality reflector/surface. For some embodiments, the degree of directionality may be varied to balance the ability for light to propagate through and escape the non-opaque volume. If the photon is reflected between surfaces/planes which are not parallel but rather one is angled towards the other, as applies to some embodiments, then reflection from such surface(s) may reduce the angle of incidence for subsequent reflections (whereby, for some embodiments, smaller angles of incidence may increase the probability of the photon escaping the non-opaque volume). Furthermore, for some embodiments, light may enter from a side such that, as light propagates in the direction heading away from where light entered, the angled faces are sloping/becoming closer together (or thereabouts). Furthermore, for some embodiments, the reflections have some degree of directionality (i.e. not a perfect degree of non-directionality) so that the slope may influence the direction of reflection as described. If, as applies to some embodiments, the surface(s) are sloped as described and the degree of non-directionality is high then a directing influence on the propagation of light may still be exerted even with the highest possible degree of non-directionality. This may be because there are more possible paths (given that the angle of reflection may be random or Lambertian) for photons to propagate in the direction(s) where the surface(s) are sloping away from each other (becoming further apart) compared to opposite direction(s) (whereby, for some embodiments, this could assist or contribute towards light propagating further from the surface where light enters). This may be, for some embodiments, if light enters from a side such that, as light propagates in the direction heading away from where light entered, the angled surface(s) are sloping/becoming further apart (or thereabouts).

For some embodiments, the geometry of the non-opaque volume may have: one or more surfaces which are orientated to illuminate photodetectors(s)/image sensor(s) and one or more surfaces which are oriented such that light emitted by light source(s) can enter the non-opaque volume. For some embodiments, the geometry of the non-opaque volume may have: one or more surfaces which are orientated towards the photodetectors(s)/image sensor(s) which are illuminated and one or more surfaces which are oriented towards light source(s) such that emitted light can enter the non-opaque volume. For some embodiments, the geometry of such a non-opaque volume may be adjusted to suit application-specific or embodiment-specific constraints, provided there are surfaces for light to enter and exit the volume such that photodetector(s)/image sensor(s) are illuminated. For example, this may include (and is not limited to): form factor constraints, mechanical constraints, structural constraints, thermal constraints, physical constraints etc.

For some embodiments, the geometry of the non-opaque volume may comprise at least one pair of surfaces which lie in parallel planes or planes that are approximately or near parallel.

For some embodiments, the geometry of the non-opaque volume may be constructed by taking a volume comprising at least one pair of surfaces which lie in parallel planes or planes that are approximately or near parallel, then taking one surface of the pair and angling or sloping it towards the other surface of the pair. For some embodiments, at least one surface of this pair may be reflective with some degree of directionality. Thus, the angling or sloping may reduce the angle of incidence for light reflected of the one surface not the other. A smaller angle of incidence, for reasons explained previously, may assist light to escape the non-opaque volume. For some embodiments, the degree of directionality of such surfaces may be (relatively) poor.

For some embodiments, the geometries of the non-opaque volume include polyhedral, prismatoidal, the general (polynomial) prismatoid, spheroidal (including sections thereof), prismatic, conical (including sections thereof), spherical (including sections thereof), circular/elliptical/parabolic/hyperbolic cylindrical (including sections thereof), etc.

For some embodiments, the edges and/or corners of the non-opaque volume are sharp or well defined. For some embodiments, the edges and/or corners of the non-opaque volume are blended or not well defined. For some embodiments, the edges and/or corners of the non-opaque volume are treated with a command edge/corner treatment such as including but not limited to: rounding, chamfering, filleting, smoothing, blending, curving, radiusing, filling, planing, variations, combinations or equivalents thereof. For some embodiments, no edge/corner treatment is applied.

For some embodiments, there is at least one surface of the non-opaque volume that is transmissive or partially transmissive such that light can exit from this surface thus illuminating photodetector(s)/image sensor(s). For some embodiments, this surface is distinct from the surface of photodetector(s) or image sensor(s). For some embodiments, this surface is coincident with the surface of photodetector(s)/image sensor(s). For some embodiments, this surface is placed against the surface of photodetector(s)/image sensor(s). For some embodiments, this surface is parallel to the surface of photodetector(s)/image sensor(s). For some embodiments, this surface is oriented towards the surface of photodetector(s)/image sensor(s). For some e embodiments, this surface separated from the surface of photodetector(s)/image sensor(s). For some embodiments, this surface is bonded to the surface of photodetector(s)/image sensor(s). For embodiments where photodetector(s)/image sensor(s) are enclosed within or placed inside the non-opaque volume then the boundary or interface between the photodetector(s)/image sensor(s) may be considered a transmissive or partially transmissive surface such that light can exit the non-opaque volume and illuminate photodetector(s)/image sensor(s). In such cases, the surface of the photodetector(s)/image sensor(s) and the surface of the non-opaque volume may be considered to be coincident. For embodiments where the non-opaque volume comprises optical free space, the surface where light exits may comprise a transmissive or partially transmissive window. For embodiments where the non-opaque volume comprises optical free space, the surface where light exits may comprise an opening in the volume (wherein the surface is the open area) thus creating an optical free space path for light to exit the non-opaque volume.

For some embodiments, there is at least one surface of the non-opaque volume that is transmissive or partially transmissive such that light, emitted by light source(s) can, enter the volume from this surface. For some embodiments, this surface is distinct from the surface of light source(s). For some embodiments, this surface is coincident with the surface of light source(s). For some embodiments, this surface is placed against the surface of light source(s). For some embodiments, this surface is parallel to the surface of light source(s). For some embodiments, this surface is oriented towards the surface of light source(s). For some embodiments, this surface separated from the surface of light source(s). For some embodiments, this surface is bonded to the surface of light source(s). For embodiments where light source(s) are enclosed within or placed inside the non-opaque volume then the boundary or interface between the light source(s) may be considered a transmissive or partially transmissive surface such that light (emitted by the light source(s)) can enter the non-opaque volume. In such cases, the surface of the light source(s) and the surface of the non-opaque volume may be considered to be coincident. For embodiments where the non-opaque volume comprises optical free space, the surface where light enters may comprise a transmissive or partially transmissive window. For embodiments where the non-opaque volume comprises optical free space, the surface where light enters may comprise an opening in the volume (wherein the surface is the open area or cut-out) thus creating an optical free space path for light to enter the non-opaque volume.

For some embodiments, additional optics may be used to direct light emitted by light source(s) into the non-opaque volume (including but not limited to: mirrors, beam splitters, beam expanders, lenses, filters, fiber optics, any other optics, any other way of directing light etc.). For a non-limiting example such optics may be inserted in the optical path between light source(s) and non-opaque volume (508) etc. For some embodiments, additional optics may be used to direct light exiting the non-opaque volume onto photodetector(s)/image sensor(s) (including but not limited to: mirrors, beam splitters, beam expanders, lenses, filters, fiber optics, any other optics, any other way of directing light etc.). For some embodiments, the additional optics may be attached to, appended to, or form part of the non-opaque volume. Example of this may include, but are not limited to: glueing (or otherwise joining) a lens (or arrays thereof) onto a surface where light enters the non-opaque volume, forming curved feature(s) (or arrays thereof) onto a surface where light enters/exits which may (for some embodiments) provide a lens-like function, etc. For some embodiments, one or more photodetector(s)/image sensor(s)/pixels of image sensor(s) may sit directly or flush (532) against the non-opaque volume. For some embodiments, one or more photodetector(s)/image sensor(s)/pixels of image sensor(s) may be separated a distance (534) from the non-opaque volume by spacer(s), optical free space, interposed materials, films, filters, vacations and/or combinations thereof, or otherwise.

Some embodiments may have more than one non-opaque volume. Some embodiments may have one non-opaque volume. Some embodiments may have more than one non-opaque light source. Some embodiments may have one non-opaque light source. Some embodiments may have more than one photodetector. Some embodiments may have one photodetector. Some embodiments may have more than one image sensor. Some embodiments may have one image sensor.

Some embodiments may comprise of one or more light sources which produces the light which enters the non-opaque volume. For some embodiments, any light source may be used. For some embodiments, at least one light source may comprise any combination of: a fluorescent light source, an incandescent light source, an electroluminescent light source, a diode light source, a laser light source. Some embodiments may comprise a diode light source. For some embodiments, the diode light sources may comprise: a light emitting diode (LED), an LED with fluorescent phosphor, a white LED, a multicolor LED, a red-blue-green LED, a laser diode, an organic light emitting diodes, a polymer light emitting diode, a heterojunction laser, a heterojunction light emitting diode or any other LED or laser diode type technology. For some embodiments, the light source is coherent. For some embodiments, the light source is incoherent. For some embodiments, the light source is polychromatic. For some embodiments, the light source is monochromatic or effectively monochromatic. For some embodiments, the light source is ambient or environmental light.

For some embodiments, the uniform (or more uniform) illumination pattern(s) produced by the non-opaque volume(s) and/or the interior reflective surfaces thereof, may potentially enable a larger or enhanced number of photodetectors/image sensors/pixels since there is a larger usable area for positioning the photodetector/image sensors so that they are properly illuminated. For some embodiments, the uniform (or more uniform) illumination pattern(s) produced by the non-opaque volume(s) and/or the interior reflective surfaces thereof, may potentially result in a consistent (or more consistent) response produced by some photodetectors/pixels/image sensors of the plurality of which are illuminated. For some embodiments, this may potentially result in more consistent/dependable and/or simpler to characterize statistical properties of random numbers and/or simpler postprocessing of random numbers or constraints thereof. For some embodiments, the statistical characteristics of the generated random numbers prior to postprocessing are characterized in order to apply (or appropriately configure) the applicable postprocessing methods or strategies. This would depend on the postprocessing strategy selected (if postprocessing is used) for a particular embodiment. For a non-limiting example, some embodiments may apply postprocessing via a randomness extractor (including but not limited to, Trevisan's extractor, Toeplitz extractor etc.) wherein it may be beneficial to estimate statistical characteristics (including but not limited to min-entropy) of random numbers prior to postprocessing in order to properly perform randomness extraction.

For some embodiments, the non-opaque volume may enable illumination of photodetector(s)/image sensor(s) in a footprint which could potentially be (though not guaranteed to be) smaller than if the same photodetector(s)/image sensor(s) (and amount thereof) were illuminated by an unmodified light source suitably positioned so that the illumination pattern is sufficiently uniform. This may be because, the closer the light source(s) to the illuminated area the less area can be illuminated and the less uniform the illuminated area is. Hence, this may lead the light source to be positioned some distance away from the photodetector(s)/image sensor(s) leading to a bulky or large device. For some embodiments, wherein the photodetectors are CMOS/CCD image sensors, the miniature size of such image sensors could potentially be partially or fully negated by this additional bulk. Whereas, for some embodiments which employ a non-opaque volume this may not be the case. For some embodiments, the natural illumination pattern of the light source(s) (that is, the illumination pattern prior to entering the non-opaque volume) may be non-uniform or highly non-uniform (for example, this could be the case for emitters including but not limited to: LEDs, lasers, laser diodes, low divergence emitters, anisotropic divergence emitters, etc.). If a non-opaque volume is not employed by such an embodiment, the discussed effects could be intensified leading to a bulky or large device and/or smaller area illuminated (to sufficient uniformity).

For some embodiments, the non-opaque volume may enable illumination of photodetector(s)/image sensor(s) in a footprint which could potentially be (though not guaranteed to be) smaller than if the same photodetector(s)/image sensor(s) (and amount thereof) were illuminated by an unmodified light source suitably positioned and including a transmissive filter with diffusive characteristics so that the illumination pattern is sufficiently uniform. This may be because, the closer the light source the less area can be illuminated and the less uniform the illuminated area is. Though a filter with diffusive characteristics may be used, the performance cannot exceed that of an ideal Lambertian intensity distribution (an ideal diffusive transmissive element) and this performance may not be practical to achieve. Even if the illumination pattern were the ideal Lambertian distribution (and this may not be achievable), this illumination pattern is not uniform as it is Lambertian or a projection thereof. This may limit the ability to attain sufficient uniformity, if at all, and may lead to the light source being positioned some distance from the photodetector(s)/image sensor(s). Thus, it still holds that, despite using a transmissive filter with diffusive characteristics, the closer the light source the less area can be illuminated and the less uniform the illuminated area is. Hence, this may lead the light source to be positioned some distance away from the photodetector(s)/image sensor(s) leading to a bulky or large device. For some embodiments, wherein the photodetectors are CMOS/CCD image sensors, the miniature size of such image sensors could potentially be partially or fully negated by this additional bulk. Whereas, for some embodiments which employ a non-opaque volume this may not be the case.

For some embodiments, the same reflective treatment is applied to the reflective surface(s). For some embodiments, the different reflective treatments are applied to some reflective surface(s). For some embodiments, the reflective surface(s) have the same reflectivity. For some embodiments, some reflective surface(s) have differing reflectivity.

For some embodiments, the bulk of the non-opaque volume may include any combination of occlusions, particulates, grit, textures, or embedded structures differentiated in refractive index and/or opacity from the surrounding material. The distribution of such features may be random, orderly, or the result of applying a space filling method. This causes light scattering within the bulk of the non-opaque volume. When light is scattered within the bulk of the non-opaque volume, the light/photon changes direction of propagation. This may increase the fraction of light which strikes the surface(s) of the non-opaque volume at a relatively low angle of incidence. This may increase the ability of light to escape the non-opaque volume because: light striking the surface(s) at a higher angle of incidence may require more reflections to propagate the same distance through the non-opaque volume thus providing more opportunity for light to escape, for some embodiments at lower angle of incidence the reflectivity of the surface(s) reduces while transmissivity increases allowing for more light to escape (particularly for embodiments where reflectivity is mainly the result of a difference in refractive index). For some embodiments, this may contribute towards improving the uniformity of the illumination pattern. For some embodiments, the scattering may spread light such that it may improve uniformity. Examples include, but are not limited to: dispersing particulates throughout the bulk material matrix with uniform or non-uniform concentration, introducing irregularities into the bulk material to create occlusions, introducing additional material(s) with distinct refractive indexes or opacities into the bulk matrix, embedding beads, granules or similar structures etc. This does not apply to all embodiments. For some embodiments, the non-opaque volume does not scatter light, or does not substantially scatter light. For some cases, the bulk of the non-opaque volume may comprise an optical medium which scatters light to so some degree, but the effect is not substantial and thus does not have a substantial effect on the way the device functions. For some cases, the bulk of the non-opaque volume may comprise an optical medium which is sufficiently clear such that no light scattering or a negligible amount of lights scattering occurs.

For some embodiments the spatial arrangement of photodetectors/image sensors/pixels of image sensor(s) are either geometrically symmetrical about the one-or-more light sources which illuminate the non-opaque volume, or geometrically asymmetrical about the one-or-more light sources which illuminate the non-opaque volume. For some embodiments, asymmetrical arrangements are enabled by the fact that the non-opaque volume provides sufficiently uniform illumination meaning that the light intensity at a photodetector/image sensor/pixel is sufficiently consistent between photodetectors/image sensors/pixels despite the asymmetrical arrangement. For some embodiments, the illumination pattern is sufficiently uniform to reduce the sensitivity of device performance to the arrangement of photodetectors/image sensors/pixels (as position-dependent intensity variation are reduced to the extent that they are non-detrimental). This may reduce or eliminate constraints on the arrangement of photodetectors/image sensors/pixels and/or enable a larger number of photodetectors/image sensors/pixels.

For some embodiments, the pitch/spacing of photodetectors is constant or approximately constant. For some embodiments, the pitch/spacing of photodetectors is variable.

For some embodiments, a transmissive filter may be inserted into the optical path of one or more image sensor(s)/photodetector(s). For some embodiments, the transmissive filter may be a consequence of the filter being pre-installed/pre-configured or may be added to adapt the spectral characteristics of the light source to the sensor or vice versa. For some embodiments, a pre-installed/pre-configured filter may be removed. However, for some embodiments it may be inappropriate (expensive, difficult, resulting in little benefit, or otherwise, etc.) to remove such a transmissive filter. In such cases, the filter may be left in place. For some embodiments, the pre-installed/pre-configured filter comprises a color filter array (including but not limited to a Bayer filter). For some embodiments, the filter comprises a color filter array (including but not limited to a Bayer filter).

For some embodiments, the intensity of light source(s) during regular operating conditions may be set such that it avoids the condition such as where: (on average) 100% of photodetector(s)/pixel(s) of image sensor(s) are saturated for (on average) a 100% time fraction, or similar. In this case the response of photodetector(s)/pixel(s) of image sensor(s) may lose stochastic/unpredictable characteristics, meaning that the response produces no entropy. This is because the stochasticity of photon statistics is no longer being translated into stochasticity of the photodetector(s)/pixel(s) of image sensor(s) response. The illumination intensity varies between embodiments and applications since it depends on many factors. Such factors may be include (but are not limited to): extinction and/or optical losses, sensitivity of photodetector(s) and/or image sensor(s), amplification of response (for relevant photodetector(s)/image sensor(s)), integration time (for relevant photodetector(s)/image sensor(s)), dynamic range of photodetector(s) and/or image sensor(s), saturation level of photodetector(s) and/or image sensor(s), saturation intensity level (as determined by: full well capacity, maximum count rate, minimum interarrival time, etc. depending on the type of photodetector or image sensor) of photodetector(s) and/or image sensor(s), statistics of the generated response, other considerations, variations and/or combination thereof, etc. One possible way, for some embodiments to determine the illumination intensity is to adjust it until photodetector(s)/pixel(s) of image sensor(s) do not produce a saturated response ((on average) 100% of photodetector(s)/pixel(s) of image sensor(s) are saturated for (on average) a 100% time fraction, or similar).

For some embodiments, illumination intensity and/or operating parameters relating to photodetector(s)/image sensor(s) may be set (determined) to appropriate values. These values depend upon the particular embodiment, the particular photodetector(s)/image sensor(s), optical properties of the particular illumination system (including the non-opaque volume etc.), the particular application (and constrains related thereof) and/or relevant operating conditions (and constraints related thereof). Examples of parameters (pertaining to various embodiments having various types of photodetectors and/or light source(s)) which may be set or determined, include (but are not limited to) any combination of: illumination intensity, illumination time interval, integration time, accumulation time, amplification/gain (analog or digital), pulse counting time window, interarrival time window, signal conditioning parameters, variation thereof, any other relevant parameters etc. Some possible ways for determining possible appropriate values for such parameters, which may be applicable to some embodiments, are explained as follows. This is not an exhaustive list of all possible ways of determining possible appropriate values for such parameters and some embodiments utilize other ways. Generally, any way may be used (if it is appropriate for the respective embodiment) and use of other ways does not comprise a substantial variation of disclosed embodiments. Some embodiments may be agnostic of the particular way chosen, though this does not preclude a particular embodiment from deriving advantage from a particular chosen way. Some embodiments may utilize a future-developed way of determining appropriate values for the parameters. A measure of effective intensity is any quantity which (directly or indirectly) is indicative of the effect the applied illumination has on the photodetector. Example of measures of effective intensity include but are not limited to: a mean/average of photodetector response, a generalized mean (power mean) of the photodetector response, the median of photodetector response, the mode of photodetector response, a measure of central tendency of the photodetector response, intensity measured by photodetector, a value derived from a subset of photodetectors, a dedicated intensity sensor, any combination or version thereof etc. A measure of effective variability is any quantity which (directly or indirectly) is indicative of the spread and/or dispersion and/or entropy and/or variability and/or unpredictability of photodetector response. Higher and lower values for measures of effective variability corresponds to higher unpredictability/entropy and lower unpredictability/entropy respectively. Example of measures of effective variability include but are not limited to: entropy, a Renyi entropy, Shannon entropy, min-entropy, variance, standard deviation, standard error, moments of an order of at least two, range, any range-like measure (such as the absolute range, interquartile range, interdecile range, studentized range etc.) any measure of statistical dispersion, any variation or combination thereof, etc. The measure of effective intensity and measure of effective variability may be used to evaluate whether parameter values are appropriate, for some embodiments. If a measure of effective intensity is above a desired value, then a type A adjustment to the values may be performed. If a measure of effective intensity indicates photodetector saturation or that the intensity is too near to saturation, then a type A adjustment to the values may be performed. If a measure of effective variability is below a desired value, then a type B adjustment to the values may be performed. If a measure of effective variability is below a desired value and a measure of effective intensity is above a desired value or too near to saturation, then a type A adjustment may be performed. Type A adjustments are changes to parameters which may have the effects of reducing the magnitude of or attenuating the response of photodetectors. Type B adjustments are changes to parameters which may have the effects of increasing the magnitude of or amplify the response of photodetectors. Examples of type A adjustments (pertaining to various embodiments having various types of photodetectors and/or light source(s)) include (but are not limited to) any combination of: decreasing illumination intensity, decreasing illumination time interval, decreasing integration time, decreasing accumulation time, decreasing amplification/gain (analogue or digital), decreasing pulse counting time window, decreasing interarrival time window, the opposite adjustment to a type B adjustment, any variation thereof etc. Examples of type B adjustments (pertaining to various embodiments having various types of photodetectors and/or light source(s)) include (but are not limited to) any combination of: increasing illumination intensity, increasing illumination time interval, increasing integration time, increasing accumulation time, increasing amplification/gain (analogue or digital), increasing pulse counting time window, increasing interarrival time window, the opposite adjustment to a type A adjustment, any variation thereof etc.

FIG. 4 is an illustrative example of the probability (752) distribution of photodetector response minus the mean photodetector response (n-<n>, wherein n is the response value) (754) showing the photodetector dark noise component (756) and component due to incident photons/photon shot noise (758). The contribution of photon-induced noise (758) to the total noise (760) exceeds the contribution of photodetector dark noise (756). This may be for reasons including but not limited to the photon-induced component (754) having a larger spread and/or entropy compared to dark noise component (756). It should be noted that illustrated dark noise distribution (756), photon-induced noise distribution (758), and total noise distribution (760) does not imply any limitation on the actual distribution shape or function, the illustration merely contrasts the different degrees the components contribute to the total noise and may or may not be representative of data relating to any particular embodiment. For some embodiments, any of these distributions may be symmetrical. For some embodiments, any of these distributions may be asymmetrical or skewed etc. For some embodiments, any of these distributions may be Gaussian or Poissonian or exponential or some distribution function derived thereof, a continuous or discretized variant thereof, or another kind of distribution entirely.

What is claimed is as follows:

1. A device for generating random numbers, comprising:

at least one light source emitting photons entering at least one non-opaque volume;

at least one surface adapted to reflect the photons internal to the at least one non-opaque volume;

a plurality of photodetectors, at least one of the plurality of photodetectors being illuminated with the photons;

at least one digitizer digitizing a response of the plurality of photodetectors, yielding random numbers, wherein the response is stochastic due to photon statistics, and a configuration of the at least one light source, the at least one non-opaque volume and the plurality of photodetectors is selected from a group consisting of:

a configuration in which the at least one light source emits the photons entering the at least one non-opaque volume which propagate via multiple reflections through the at least one non-opaque volume and exit the at least one non-opaque volume thus illuminating the at least one of the plurality of photodetectors, wherein at least one surface where the photons exit is not parallel to at least one plane in which lies a surface where the photons entered the at least one non-opaque volume;

a configuration in which the at least one light source emits the photons entering the at least one non-opaque volume which reflect from the at least one surface thereby illuminating the plurality of photodetectors, wherein for a plurality of points on the at least one surface of the at least one non-opaque volume a degree of directionality is different; and a configuration in which the at least one light source emits the photons entering the at least one non-opaque volume which reflect repeatedly between at least two surfaces of the at least one non-opaque volume thereby illuminating the plurality of photodetectors, wherein the at least one light source does not lie in a same plane as the plurality of photodetectors.

2. The device of claim 1, wherein the configuration of the at least one light source, the at least one non-opaque volume and the plurality of photodetectors comprises the configuration in which the at least one light source emits the photons entering the at least one non-opaque volume which propagate via multiple reflections through the at least one non-opaque volume and exit the at least one non-opaque volume thus illuminating the at least one of the plurality of photodetectors, wherein the at least one surface where the photons exit is not parallel to the at least one plane in which lies the surface where the photons entered the at least one non-opaque volume.

3. The device of claim 1, wherein the configuration of the at least one light source, the at least one non-opaque volume and the plurality of photodetectors comprises the configuration in which the at least one light source emits the photons entering the at least one non-opaque volume which reflect from the at least one surface thereby illuminating the plurality of photodetectors, wherein for the plurality of points on the at least one surface of the at least one non-opaque volume the degree of directionality is different.

4. The device of claim 1, wherein the configuration of the at least one light source, the at least one non-opaque volume and the plurality of photodetectors comprises the configuration in which the at least one light source emits the photons entering the at least one non-opaque volume which reflect repeatedly between the at least two surfaces of the at least one non-opaque volume thereby illuminating the plurality of photodetectors, wherein the at least one light source does not lie in the same plane as the plurality of photodetectors.

5. The device in claim 1, wherein the at least one light source is a diode.

6. The device in claim 1, wherein at least one photodetector of the plurality of photodetectors is selected from a group consisting of a pixel of a complementary metal oxide semiconductor (CMOS) image sensor, and a pixel of a charge-coupled device (CCD) image sensor.

7. The device in claim 1, wherein at least one photodetector of the plurality of photodetectors has a sensitivity limit from a single-photon level to a two or more photon level.

8. The device in claim 1, wherein a geometry of the at least one non-opaque volume has at least one pair of surfaces which lie in parallel planes and the photons reflect from both of the at least one pair of surfaces and pass from one surface of the at least one pair to another surface of the at least one pair.

9. The device in claim 1, wherein the at least one non-opaque volume includes a geometry constructed by taking a body comprising at least one pair of surfaces which lie in parallel planes, and angling one surface of the at least one pair of surfaces towards the other.

10. The device in claim 1, wherein the at least one non-opaque volume comprises at least one material which is glassy and the at least one non-opaque volume consists of one or more materials and media selected from a group consisting of non-liquid materials, optical free space media, coatings and adhesives.

11. The device in claim 1, wherein the device is adapted with a postprocessor to post-process the random numbers via a post-processing method comprising a method selected from a group consisting of: randomness extraction, post-processing via a pseudorandom function, and post-processing via a hash function.

12. The device in claim 1, wherein the at least one photodetector of the plurality of photodetectors is illuminated such that a contribution of photon shot noise to a total noise of a response of the at least one photodetector exceeds a contribution of photodetector dark noise to the total noise.

13. The device in claim 1, wherein the at least one non-opaque volume comprises optical free space.

14. The device in claim 1, wherein the at least one non-opaque volume comprises at least one polymeric material and the at least one non-opaque volume consists of one or more materials and media selected from a group consisting of non-liquid materials, optical free space media, coatings and adhesives.

15. The device in claim 1, wherein at least a portion other than a surface of the at least one non-opaque volume scatters light and comprises a solid.

16. The device in claim 1, wherein the at least one non-opaque volume comprises a volume with a solid bulk material.

17. The device in claim 1, wherein the at least one non-opaque volume comprises a volume comprising a closed hollow structure with at least one partially to fully transmissive window.

18. The device in claim 1, wherein the at least one non-opaque volume comprises a volume selected from a group consisting of: a non-opaque volume comprising a closed hollow structure with at least one partially to fully transmissive window, and a volume with a solid bulk material.

19. A method for generating random numbers, comprising:

emitting photons into a non-opaque volume;

illuminating a plurality of photodetectors with the photons such that a response of the plurality of photodetectors is stochastic due to photo statistics; and digitizing the response to yield random numbers, wherein said illuminating the plurality of photodetectors is selected from a group consisting of:

propagating the photons via multiple reflections, the photons exiting via at least one surface of the non-opaque volume which is not parallel to at least one plane in which lies a surface of the non-opaque volume where light is entering, thereby illuminating the plurality of photodetectors;

reflecting the photons from at least one interior surface of the non-opaque volume, wherein for a plurality of points thereon a degree of directionality is different, thereby illuminating the plurality of photodetectors; and repeatedly reflecting the photons from at least two interior surfaces of the non-opaque volume thereby illuminating the plurality of photodetectors which do not lie in the same plane as a light source emitting light.

20. The method of claim 19, wherein said illuminating comprises propagating the photons via multiple reflections, the photons exiting via the at least one surface of the non-opaque volume which is not parallel to the at least one plane in which lies the surface of the non-opaque volume where the light is entering, thereby illuminating the plurality of photodetectors.

21. The method of claim 19, wherein said illuminating comprises reflecting the photons from the at least one interior surface of the non-opaque volume, and wherein for the plurality of points thereon the degree of directionality is different, thereby illuminating the plurality of photodetectors.

22. The method of claim 19, wherein said illuminating comprises repeatedly reflecting the photons from the at least two interior surfaces of the non-opaque volume thereby illuminating the plurality of photodetectors which do not lie in the same plane as the light source emitting light.

23. The method of claim 19, wherein said photons are emitted using a diode.

24. The method of claim 19, further comprising producing a response from at least one photodetector of the plurality of photodetectors, the at least one photodetector being selected from a group consisting of a pixel of a complementary metal oxide semiconductor (CMOS) image sensor, and a pixel of a charge-coupled device (CCD) image sensor.

25. The method of claim 19, further comprising producing a response from at least one photodetector of the plurality of photodetectors having a sensitivity limit from a single-photon level to a two or more photon level.

26. The method of claim 19, further comprising post-processing the random numbers, wherein the said post-processing comprises a method selected from a group consisting of: randomness extraction, post-processing via a pseudorandom function, and post-processing via a hash function.

27. The method of claim 19, further comprising illuminating at least one photodetector of the plurality of photodetectors such that a contribution of photon shot noise to a total noise of a response of the at least one photodetector exceeds a contribution of photodetector dark noise to the total noise.

28. The method of claim 19, wherein the non-opaque volume comprises optical free space.

29. The method of claim 19, wherein the non-opaque volume comprises at least one material which is polymeric and the non-opaque volume consists of one or more materials and media selected from a group consisting of non-liquid materials, optical free space media, coatings and adhesives.

30. The method of claim 19, further comprising scattering the light within at least a portion other than a surface of the non-opaque volume which comprises a solid.

* * * * *